US009065155B2

(12) United States Patent
Takano et al.

(10) Patent No.: US 9,065,155 B2
(45) Date of Patent: Jun. 23, 2015

(54) ADAPTOR, ASSEMBLY OF BATTERY PACK AND ADAPTOR, AND ELECTRIC TOOL WITH THE SAME

(75) Inventors: Nobuhiro Takano, Ibaraki (JP); Yoshikazu Kawano, Ibaraki (JP); Kazuhiko Funabashi, Ibaraki (JP); Yuuichi Konuma, Ibaraki (JP); Masateru Niyada, Ibaraki (JP); Chikai Yoshimizu, Ibaraki (JP); Eiji Nakayama, Ibaraki (JP); Kenro Ishimaru, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 0 days.

(21) Appl. No.: 13/531,142

(22) Filed: Jun. 22, 2012

(65) Prior Publication Data

US 2012/0262035 A1 Oct. 18, 2012

Related U.S. Application Data

(63) Continuation of application No. 11/856,873, filed on Sep. 18, 2007, now Pat. No. 8,237,404.

(30) Foreign Application Priority Data

Sep. 19, 2006 (JP) .............................. P2006-253250
Dec. 20, 2006 (JP) .............................. P2006-342797
Feb. 8, 2007 (JP) .............................. P2007-029702

(51) Int. Cl.
H02J 7/00 (2006.01)
H01M 10/44 (2006.01)
(Continued)

(52) U.S. Cl.
CPC ............... *H01M 10/441* (2013.01); *B25F 5/02* (2013.01); *H01M 10/482* (2013.01); *H02J 7/0031* (2013.01)

(58) Field of Classification Search
CPC ........................................................ H02J 7/0045
USPC ................................. 320/110, 107, 112, 114
See application file for complete search history.

(56) References Cited

U.S. PATENT DOCUMENTS 5,283,470 A * 2/1994 Hadley et al. .................. 290/45
6,087,815 A * 7/2000 Pfeifer et al. ................. 323/282

(Continued)

FOREIGN PATENT DOCUMENTS

CN 1424786 A 6/2003
JP 5-115129 A 5/1993

(Continued)

OTHER PUBLICATIONS

Russian Office Action.

(Continued)

*Primary Examiner* — Edward Tso
*Assistant Examiner* — Ahmed Omar
(74) *Attorney, Agent, or Firm* — McDermott Will & Emery LLP

(57) ABSTRACT

When a battery pack having an output voltage of 14.4 V that is connectable to an electric tool in a sliding manner is used as a power supply source for the electric tool that is connectable to a battery pack in an insertion manner and has a rated voltage of 12 V, the electric tool and the battery pack are connected to each other with an adaptor interposed therebetween. The adaptor has an FET that is switched at a predetermined duty of a predetermined frequency. The battery pack and the electric tool are connected or disconnected to or from each other by the switching operation, thereby dropping the output voltage of the battery pack. When the detected voltage is out of a predetermined value range, it is judged that the overcurrent or overdischarge has occurred. Then, the FET is turned off to stop the electric tool.

4 Claims, 21 Drawing Sheets

(51) Int. Cl.
*B25F 5/02* (2006.01)
*H01M 10/48* (2006.01)

(56) References Cited

U.S. PATENT DOCUMENTS

| | | | |
|---|---|---|---|
| 6,388,426 | B1 | 5/2002 | Yokoo et al. |
| 6,525,511 | B2 | 2/2003 | Kubale et al. |
| 6,534,885 | B2 | 3/2003 | Nakagawa et al. |
| 6,566,843 | B2 | 5/2003 | Takano et al. |
| 6,727,679 | B2 | 4/2004 | Kovarik et al. |
| 7,339,350 | B2 * | 3/2008 | Kubale et al. .................. 320/110 |
| 2002/0149346 | A1 | 10/2002 | Sakakibara |
| 2003/0096158 | A1 | 5/2003 | Takano et al. |
| 2007/0108944 | A1 | 5/2007 | Pellene |
| 2008/0018313 | A1 | 1/2008 | Cagno et al. |
| 2008/0180059 | A1 * | 7/2008 | Carrier et al. .................. 320/112 |
| 2008/0284370 | A1 * | 11/2008 | Manor et al. .................. 320/103 |
| 2009/0146614 | A1 | 6/2009 | Carrier et al. |

FOREIGN PATENT DOCUMENTS

| | | |
|---|---|---|
| JP | 6-276728 A | 9/1994 |
| JP | 8-171942 A | 7/1996 |
| JP | 2002-262557 A | 9/2002 |
| JP | 2005-160233 | 6/2005 |
| JP | 2006-198690 | 8/2006 |

OTHER PUBLICATIONS

Japanese Notification of Reasons for Refusal, w/ English translation thereof, issued in Japanese Patent Application No. JP 2007-0297'02 dated May 25, 2012.

Chinese Office Action, with English translation, issued in Chinese Patent Application No. 200710151825.3, dated Feb. 2, 2012.

Chinese Office Action, with English translation, issued in Chinese Patent Application No. 2007101518253, mailed Dec. 4, 2009.

Indian Office Action issued in Indian Application No. 2083/CHE/2007 dated Sep. 16, 2010.

* cited by examiner

ADAPTOR, ASSEMBLY OF BATTERY PACK AND ADAPTOR, AND ELECTRIC TOOL WITH THE SAME

CROSS-REFERENCE TO RELATED APPLICATIONS

This application is a Continuation of U.S. application Ser. No. 11/856,873, filed on Sep. 18, 2007, now U.S. Pat. No. 8,237,404, which is based on and claims the benefit of priority from the prior Japanese Patent Applications No. 2006-253250, filed on Sep. 19, 2006; No. 2006-342797, filed on Dec. 20, 2007; and No. 2007-029702, filed on Feb. 8, 2007; the entire contents of which are incorporated herein by reference.

The present invention relates to an adaptor for adapting a battery pack such as secondary cells, especially lithium cells (including lithium ion cells) to other driving devices having different shapes or different driving voltages. The invention also relates to an assembly of an adaptor and a battery pack, and an electric tool having the same.

BACKGROUND

Description of the Related Art

Secondary cells with a relatively high capacity such as nickel hydrogen cells (Ni-MH) and Ni-cd cells have been used as a power supply source for driving a cordless electric tool. In addition, lithium cells including lithium ion cells have been put to practical use as a secondary cell with a high capacity and a light weight.

A nominal cell voltage of the lithium cells is about three times that of the nickel hydrogen cells or the NiCad cells that are in practical use. Basically, the NiCad cells and the nickel hydrogen cells have a nominal cell voltage of 1.2 V, and the lithium cells have a nominal cell voltage of 3.6 V. The lithium cells have an energy density about three times that of the NiCad cells, and are also smaller and lighter than the NiCad cells. In addition, since the lithium cells have good discharge efficiency and are thus dischargeable even under a relatively low temperature environment, a stable voltage can be obtained in a wide temperature range.

A 12-volt battery group (a serial connection of ten 1.2-volt NiCad cells or ten 1.2-volt nickel hydrogen cells) has been widely used for many kinds of the cordless electric tools. However, in the case of the battery group formed only of lithium cells, even if the lithium cells are connected in series, the obtainable output voltage becomes a multiple of 3.6 V since the nominal cell voltage of the lithium cells is 3.6 V. Accordingly, it was difficult to realize a battery pack applicable to the cordless electric tool having a rated voltage of 12 V. In this regard, there was suggested a method of forming a 12-volt battery pack with the assembly of the lithium cells and the NiCad or nickel hydrogen cells, as disclosed in JP-A-2005-160233.

As a method of connecting the battery pack to the cordless electric tool, there has been used, for example, an insertion connecting method in which a hollow space portion is formed in the cordless electric tool to insert an insertion portion formed on the battery pack into the space portion, or a slide connecting method in which a groove formed on the cordless electric tool is fitted to a rail formed on the battery pack so that the cordless electric tool is connected to the battery pack in a sliding manner.

SUMMARY

In the case of the battery group formed of the assembly of the lithium cells and the NiCad or nickel hydrogen cells described above, as described in Patent Document 1, since charge control methods, capacities or self-discharge levels of the cells are different from each other, in order to solve the various problems, many complicated charge controls or self-discharge controls are necessary.

Since it is difficult to directly connect the cordless electric tool and the battery pack to each other if they have different connection methods, it becomes impossible to use them, and it is thus necessary to prepare another battery pack that is suitable for the type of the connection portion of the electric tool. Meanwhile, an adapter may be used to enable the battery pack having a connection portion that is not suitable for the electric tool to be connected to the electric tool. In this case, the connection may be made even in a state where an output voltage of the battery pack is higher than a rated voltage of the electric tool. Accordingly, there is a problem that the electric tool is supplied with the voltage higher than the rated voltage, which is dangerous.

Further, overcurrent may flow or overdischarge may occur at the time of using the electric tool, or overcharge may flow at the time of charging the battery pack. Therefore, preventive measures are required for the safe use.

Accordingly, an object of the invention is to provide an adaptor, an assembly of a battery pack and an adaptor, and an electric tool, which is capable of enabling the battery pack having a connection portion that is not suitable for the electric tool to be mechanically connected to the electric tool, converting the voltage of the battery pack into the voltage corresponding to a rated voltage of the electric tool to output the converted voltage, and preventing occurrence of overcurrent and overdischarge and thus assuring the safe use.

Further, an object of the invention is to provide an adaptor that is connected to a battery pack, an assembly of the battery pack and the adaptor, and an electric tool, which can output a predetermined voltage that is hardly realized by the known assembly of lithium cells.

According to the invention, the electric tool is made connectable to the battery pack capable of outputting a predetermined voltage by the only use of a lithium cell assembly, which is difficult to obtain from a conventional cell assembly. Thus, it is possible to improve usability of the electric tool.

According to the invention, the battery pack having the connection portion that is not suitable for the electric tool is mechanically connected to the electric tool. Thus, it is possible to supply the voltage suitable for the electric tool.

According to the invention, even when the voltage of the battery pack is changed, it is possible to supply a constant voltage with a high precision and in stable manner.

According to the invention, it is possible to suppress unnecessary energy consumption of the battery pack, and thus lower power consumption is achieved.

Further, according to the invention, it is possible to prevent the occurrence of overdischarge and overcurrent of the battery pack, and thus the safe use and long life of the battery pack are ensured.

The above-mentioned and another objects, characteristics, and advantages of the invention will be classified below by the descriptions and the accompanying drawings of the present specification.

DESCRIPTION OF THE EMBODIMENTS

First Embodiment

Hereinafter, a first embodiment of the invention will be described in detail with reference to FIGS. 1 to 10.

First, referring to FIGS. 1 to 9, a configuration will be described for the case where a battery pack 100 is used as a power supply source for an electric tool 200 by being connected to an adaptor 1.

FIGS. 1 to 9 are diagrams illustrating a configuration and a use state of the adaptor 1 according to a first embodiment of the invention. The adaptor 1 is a device that mechanically and electrically connects the electric tool 200 to the battery pack 100 that outputs a voltage different from a rated voltage of the electric tool 200 to enable the use of the electric tool 200. The adaptor 1 is connectable to the battery pack 100 in a sliding manner and is connectable to the electric tool 200 in an insertion manner. The adaptor 1 converts a voltage outputted from the battery pack 100 into the rated voltage of the electric tool 200 and supplies the converted voltage to the electric tool 200 so that the electric tool 200 can be driven by the battery pack 100. Even though the battery pack to be connected to the electric tool 200 is of an insertion type, the electric tool 200 and the battery pack are not connected directly to each other if a nominal voltage of the battery pack is higher than the rated voltage of the electric tool 200.

Figure 1:
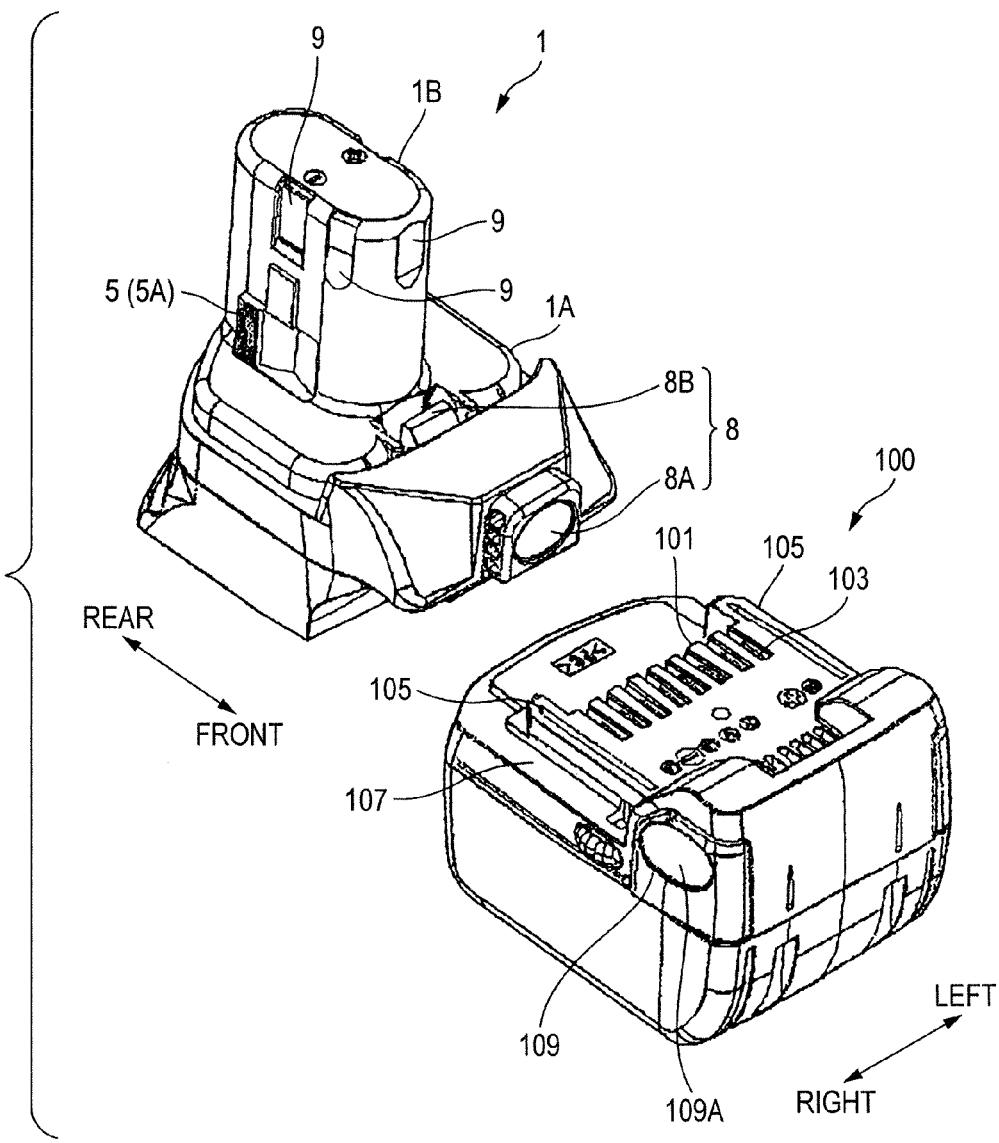
FIG. 1 is a perspective view of an adaptor and a battery pack according to a first embodiment of the invention.
Figure 2:
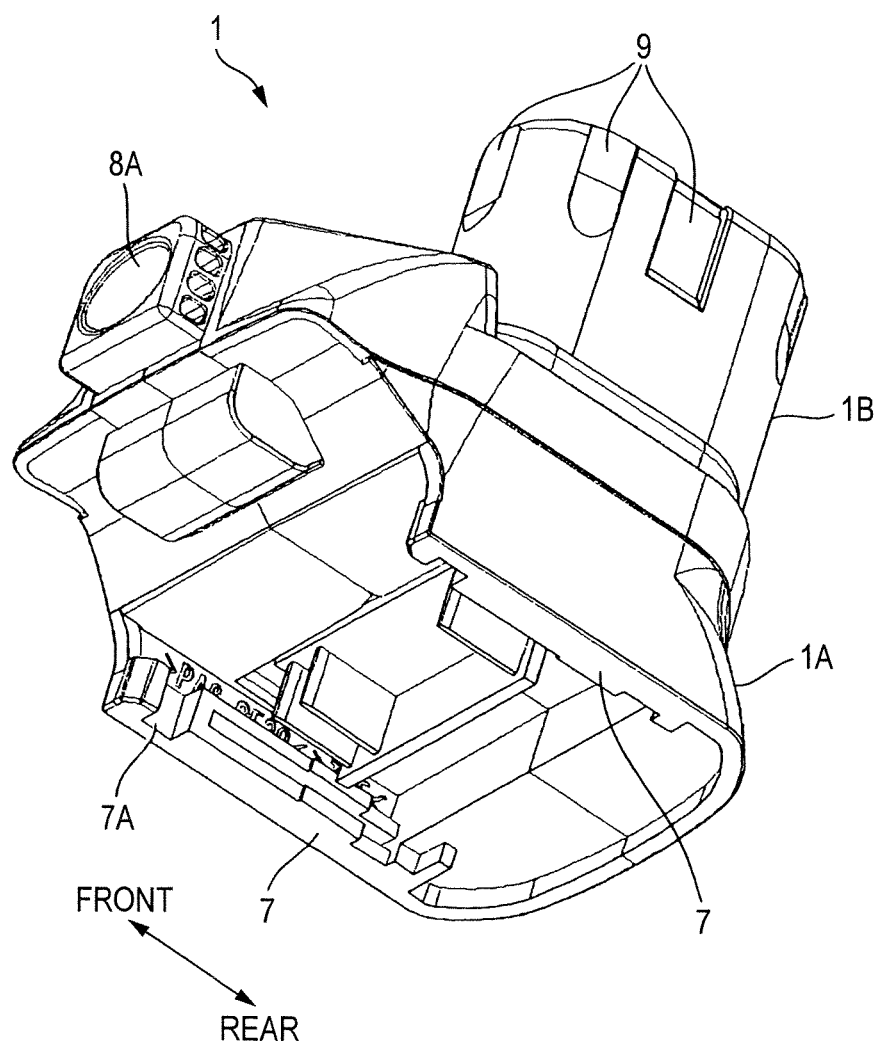
FIG. 2 is a perspective view of the adaptor according to the first embodiment as obliquely viewed from the bottom.
Figure 3:
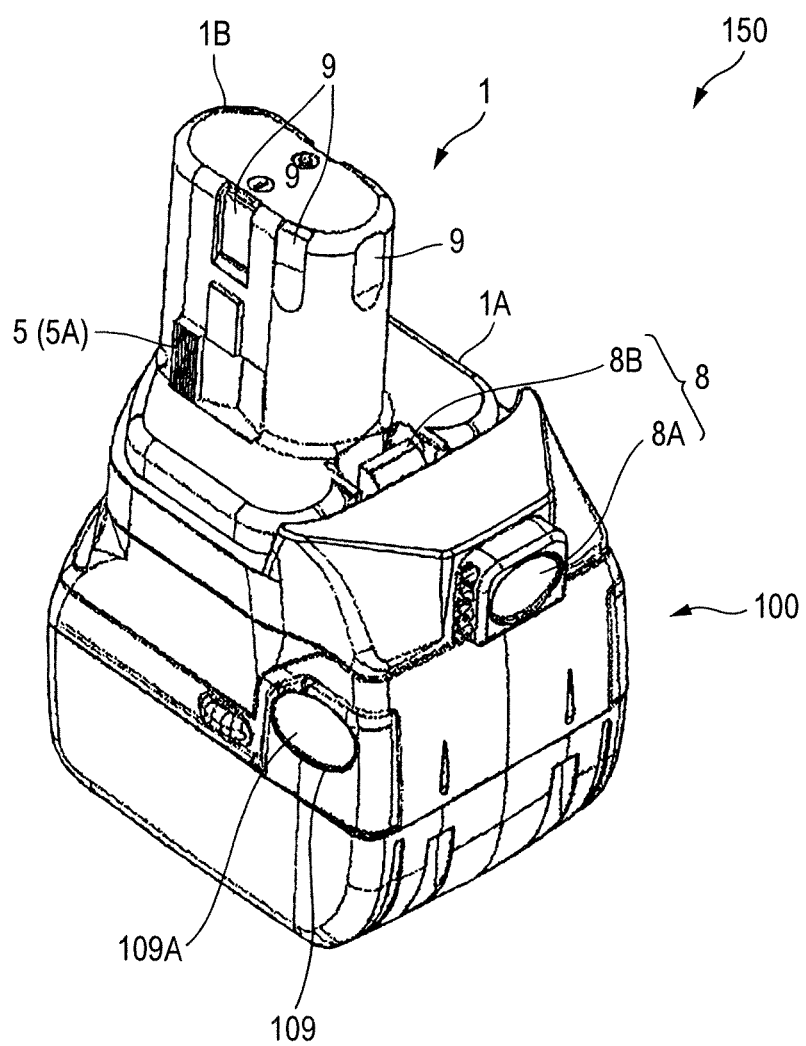
FIG. 3 is a perspective view of an adaptor-attached battery pack according to the first embodiment.

As shown in FIGS. 1 to 3, in the first embodiment, the adaptor 1 is detachably attached to the slide-type battery pack 100 in the sliding manner. As described above, the electric tool 200 according to the present embodiment is used in a state where an insertion-type battery pack (not shown) is attached thereto. A reception space (engagement portion) (not shown) that is opened outward is formed as a connection portion. Although not shown, an electrical connection portion having a plurality of terminals is provided inside the reception space. Accordingly, in order to use the battery pack 100 as a power supply source for the electric tool 200, the adaptor 1 is integrally attached integrally to the electric tool 200 and then the battery pack 100 is attached to the adaptor 1 in the sliding manner. Alternatively, an adaptor-attached battery pack 100 in which the adaptor 1 is attached in advance is attached to the electric tool 200 in the insertion manner.

Hereinafter, a configuration of the adaptor 1 will be described. The adaptor 1 is integrally formed of resin, and has a substantially rectangular parallelepiped base portion 1A and an oval cylindrical insertion portion 1B. A battery pack side connection surface (hereinafter, referred to as a bottom surface) of the base portion 1A is opened, and the insertion portion 1B integrally protrudes from the rear portion of a surface opposite to the opening portion. In addition, a circuit board (not shown) is supported and received in the interior of the adaptor 1.

The insertion portion 1B is inserted into a reception space (now shown) formed in the electric tool 200, and terminals 9 that are connected to the circuit board are exposed in the outer periphery of the insertion portion 1B on the electric tool side (hereinafter, referred to as a top portion). A switch 5 severing as an instruction portion is provided on the side of the insertion portion 1B.

When the insertion portion 1B is inserted into the reception space formed in the electric tool 200, the terminal 9 is connected to the terminal of the electrical connection portion. The switch 5 serves as a converting unit that is preset to a position suitable for a rated voltage, in order to prevent a voltage equal to or higher than the rated voltage from being applied to the electric tool 200. The switch 5 will be described in detail later.

As a tool side latch unit 8 for holding the connection to the electric tool 200, a handling portion 8A and a latch claw 8B uprightly disposed at the rear end of the handling portion 8A are provided on the front surface of the base portion 1A. The base portion 1A is provided with a reception portion (not shown) for a battery pack side latch unit 109 of the battery pack 100. As shown in FIG. 2, the bottom surface of the base portion 1A is opened, and a pair of rails 7 extending along left and right side walls in the front and rear direction extend in parallel on the left and right sides of the bottom surface.

The pair of left and right rails 7 serves as a guide at the time of attaching the battery pack 100 to the adaptor 1 in the sliding manner and serves as a lock for preventing the attached battery pack 100 from being detached from the adaptor 1.

The handling portion 8A of the tool side latch unit 8 and the reception portion (not shown) of the battery pack side latch unit 109 are disposed so that the directions thereof for biasing the latch unit does not correspond to each other. Specifically, the handling portion 8A of the tool side latch unit 8 is disposed along the front surface of the base portion 1A, and the uprightly disposed latch claw 8B is biased forward by a spring (not shown). The reception portion (not shown) of the latch unit 109 of the battery pack 100 is biased in the left and right directions of the base portion 1A.

The adaptor 1 is detached from the electric tool 200 when the handling portion 8A of the tool side latch unit 8 disposed in the adaptor 1 is pushed in a direction toward the rear side of the adaptor 1 against the biasing force of the spring. Thus, the engagement of the latch claw 8B and an engagement groove (not shown) on the electric tool 200 side is released.

Next, a configuration of the battery pack 100 will be described in detail. In the battery pack 100, plural chargeable cells such as lithium ion cells are received in a substantially rectangular parallelepiped case made of resin. As shown in FIG. 1, a connection portion 101 is disposed on an adaptor side connection surface (hereinafter, referred to as a top surface) of the battery pack 100. The battery pack 100 is provided with two handling portions 109A of the battery pack side latch unit 109 along the left and right side walls, respectively.

The connection portion 101 is provided with a terminal insertion portion 103 and a pair of left and right ribs 105. The pair of ribs 105 extend in parallel along the left and right side walls of the base portion 1A in the front and rear direction, and engagement grooves 107 having a rectangular shape in the sectional view are formed in the lower portion of the ribs 105 in parallel with each other in the front and rear directions.

In the battery pack side latch unit 109, the latch claws (not shown) protrude from the left and right engagement grooves 107, and the latch claws retreat from the engagement grooves 107 when the handling portion 109A is pushed toward the inside of the battery pack 100. When the adaptor 1 is slid toward the front side in a state in which the left and right rails 7 of the battery pack 100 are fitted to the left and right engagement grooves 107 from the rear side, the left and right rails 7 of the adaptor 1 engage with the left and right engagement grooves 107 of the battery pack 100 so that the adaptor 1 is coupled with the battery pack 100. Since the left and right latch claws are protruded outward by the restoration force of biasing unit (not shown) to engage with the engagement groove 7A of the adaptor 1, the adaptor 1 is securely attached to the battery pack 100. The adaptor 1 is attached to the battery pack 100 as described above, and thus the adaptor-attached battery pack 150 is assembled as shown in FIG. 3.

The adaptor 1 is detached from the battery pack 100 when the left and right handling portion 109A of the battery pack side latch unit 109 disposed on the battery pack 100 are pushed toward the inside of the battery pack 100 against the biasing force of the spring. Then, the engagement of the latch claws with the engagement grooves 7A of the adaptor 1 is released, and thus the adaptor 1 is detachable from the battery pack 100.

Figure 4:
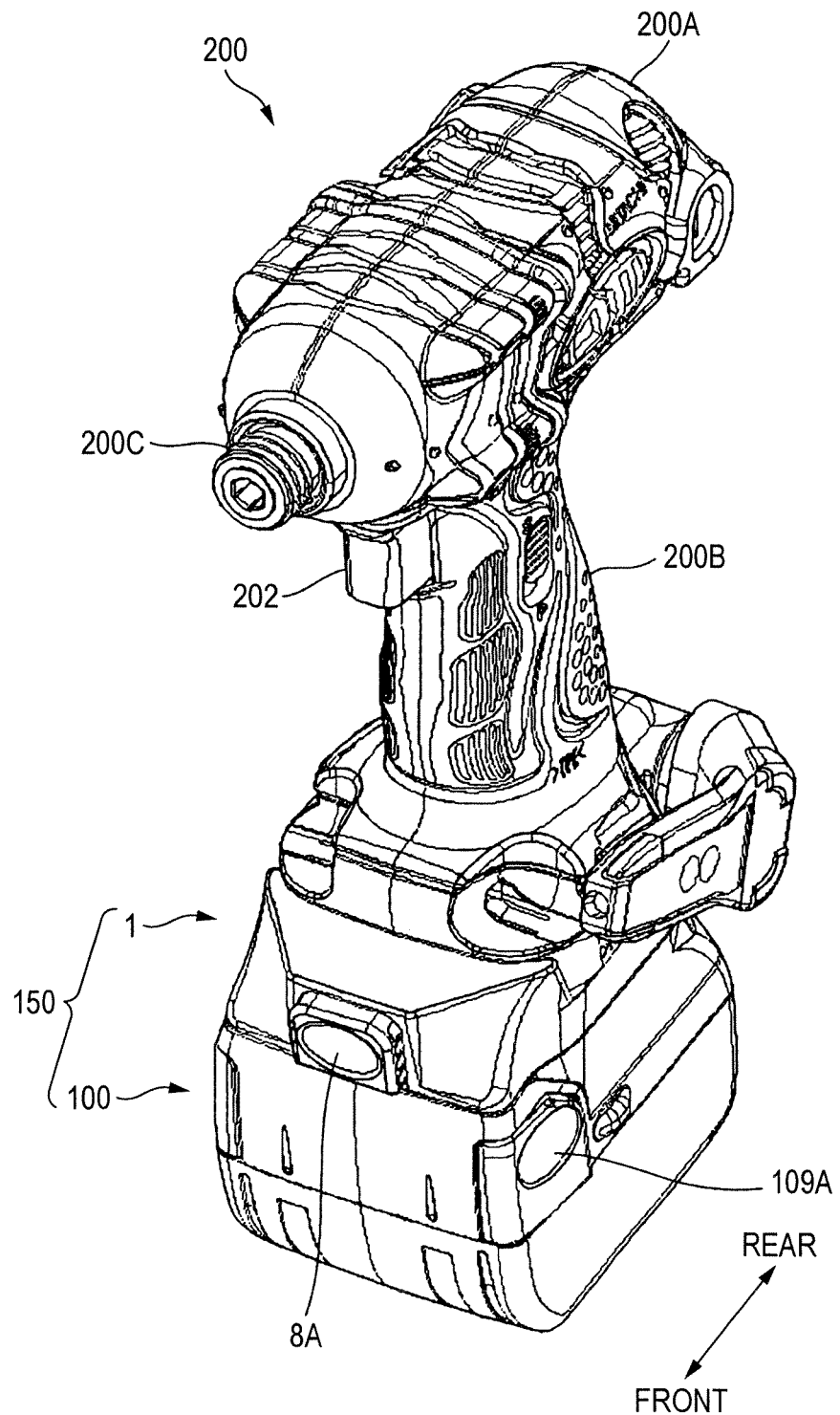
FIG. 4 is a perspective view of an electric tool according to the first embodiment.

As shown in FIG. 4, the insertion portion 1B of the adaptor-attached battery pack 150 in which the adaptor is attached to the battery pack 100 is inserted from the bottom portion of the electric tool 200 into the reception space (not shown) formed in the electric tool 200 with the adaptor 1 directed upward, thereby attaching the adaptor-attached battery pack 150 to the bottom portion of the electric tool 200.

The electric tool 200 is an electric drill or the like and has a T shape in the side view. The electric tool 200 has a body portion 200A and a handle portion 200B extending from the body portion 200A in a direction substantially perpendicular thereto. The body portion 200A has a motor (not shown) therein as a driving source. A drill chuck 200C that is a front tool holding portion is rotatably provided at the front end of the body portion 200A, and the drill chuck 200C is detachably loaded with a front tool such as a drill bite.

The handle portion 200B extends from the body portion 200A in a direction substantially perpendicular thereto, and the adaptor-attached battery pack 150 is detachably attached to the end portion (bottom portion in FIG. 4) of the handle portion 200B. The connection portion in the upper front portion of the handle portion 200B connected to the body portion 200A is provided with a trigger switch 202.

The electric tool 200 is used by attaching the insertion-type battery pack (not shown) to the bottom portion of the handle portion 200B. When the slide-type battery pack 100 is used as the power supply source, the battery pack 100 is attached to the electric tool 200 by the use of the adaptor 1.

In this case, the latch claw 8B of the tool side latch unit 8 provided in the adaptor 1 engages with the engagement groove (not shown) (the reception portion of the tool side latch unit 8) on the electric tool 200 side so that the adaptor-attached battery pack 150 is prevented from being detached from the electric tool 200. In addition, the plurality of terminals 9 disposed in the outer periphery of the insertion portion 1B of the adaptor 1 are connected to the plurality of terminals of the electrical connection portion (not shown) provided in the reception space of the handle portion 200B of the electric tool 200 so that electric power can be supplied from the battery pack 100 to the electric tool 200.

The adaptor 1 or the adaptor-attached battery pack 150 is attached to or detached from the handle portion 200B of the electric tool 200 by the tool side latch unit 8, and the adaptor 1 is attached to or detached from the battery pack 100 by the battery pack side latch unit 109.

Figure 5:
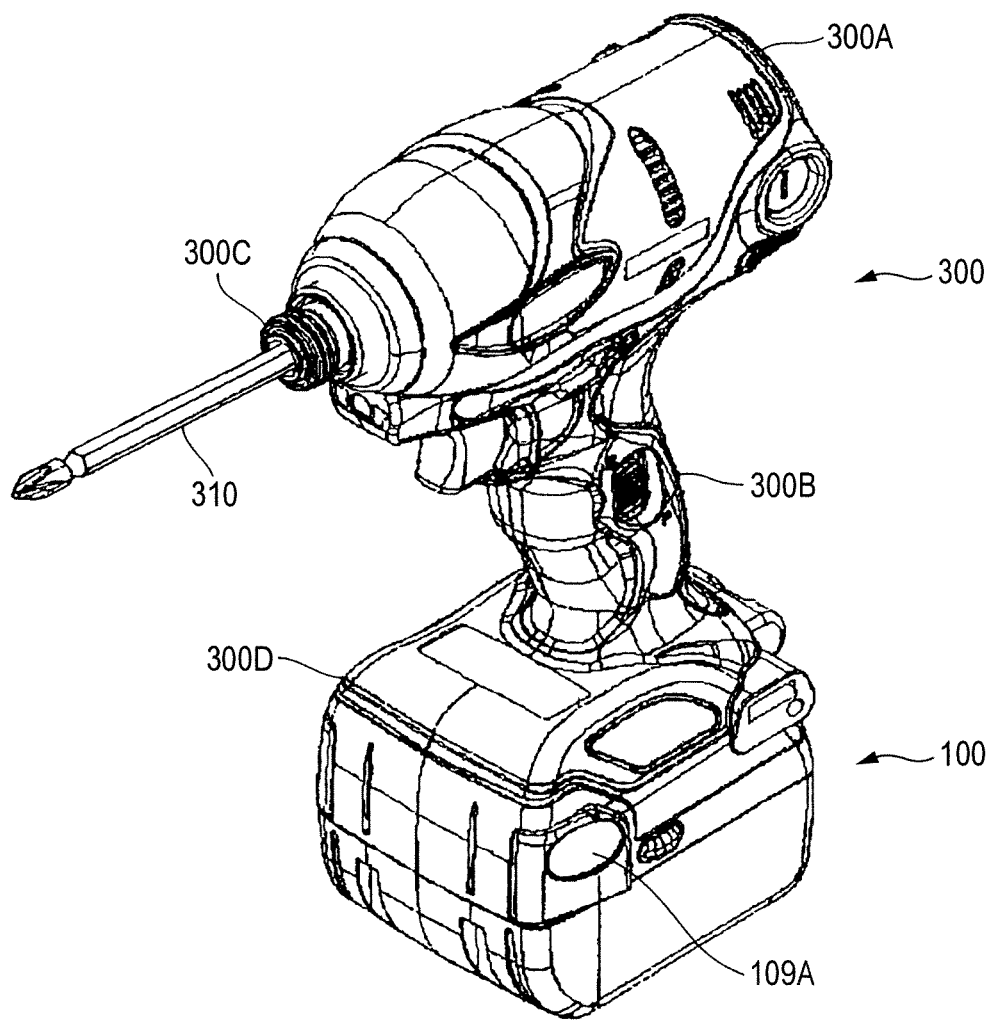
FIG. 5 is a perspective view illustrating a state where the adaptor is directly connected to the electric tool according to the first embodiment.

As shown in FIG. 5, the slide-type battery pack 100 is directly connectable to an electric tool 300 to which the slide-type battery pack is directly connectable. The electric tool 300 has a body portion 300A and a handle portion 300B extending from the body portion 300A in a direction substantially perpendicular thereto. The body portion 300A has a motor (not shown) therein as a driving source. A drill chuck 300C that is a front tool holding portion is rotatably provided at the front end of the body portion 300A, and a drill bite 310 as a front tool is detachably attached to the drill chuck 300C.

A battery pack side connection portion 300D of the handle portion 300B is configured in the slide type, and has the same configuration as the above-described battery pack side connection portion of the adaptor 100. The connection between the battery pack 100 and the electric tool 300 is made in the same connection method as that of between the battery pack 100 and the adaptor 1.

Figure 6:
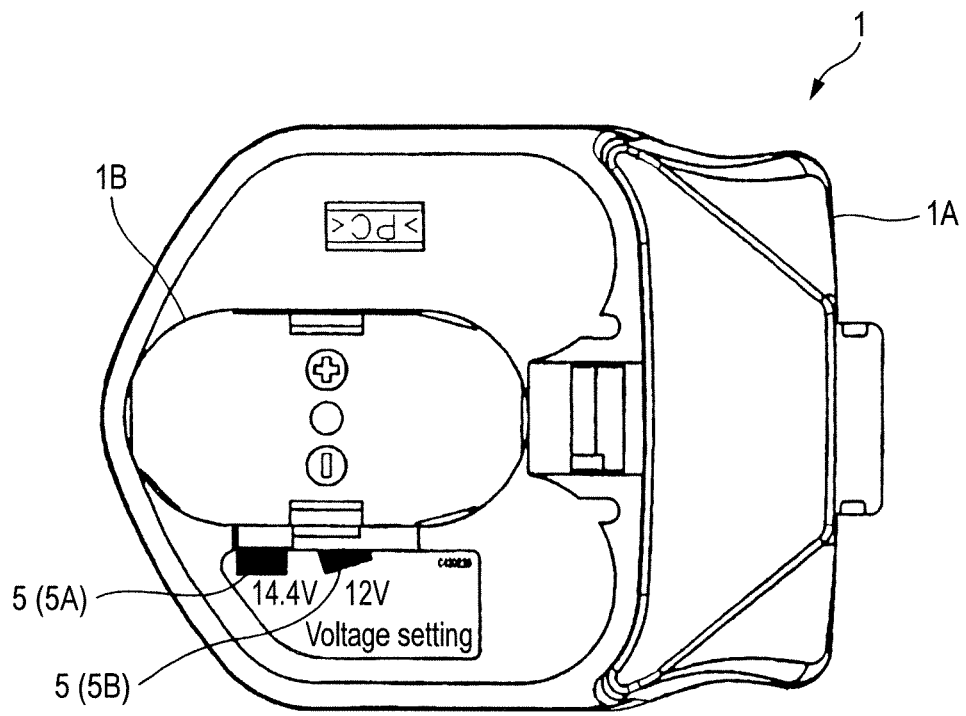
FIG. 6 is a plan view of the adaptor-attached battery pack according to the first embodiment.
Figure 7:
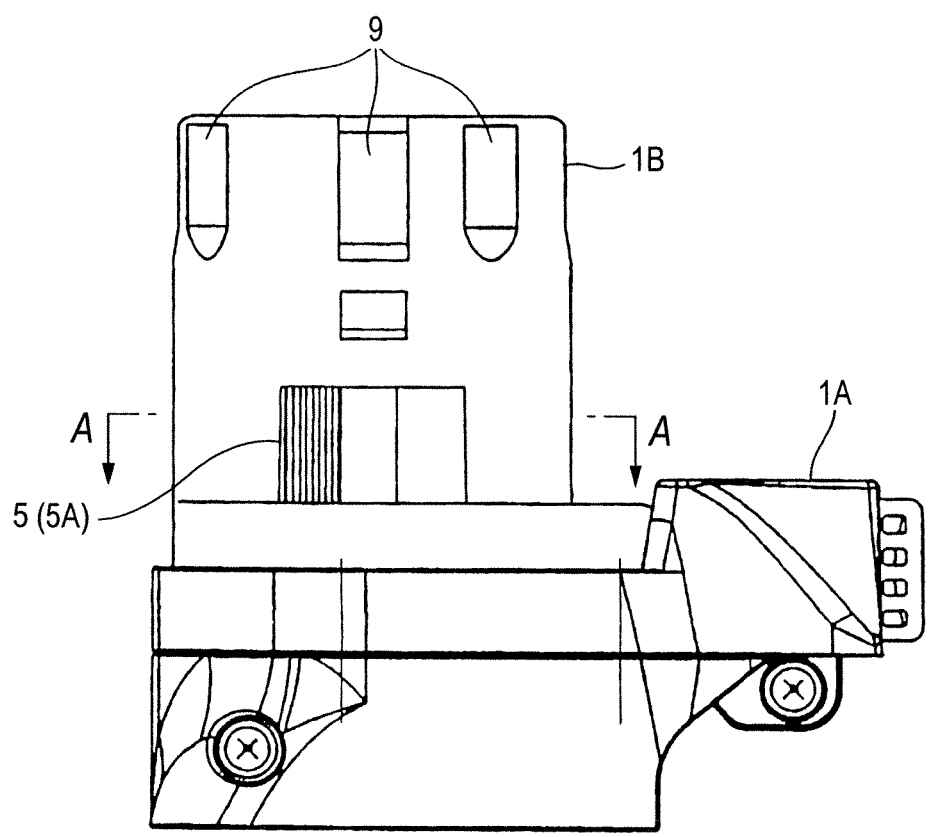
FIG. 7 is a side view of the adaptor-attached battery pack according to the first embodiment.

Subsequently, a configuration of the switch 5 will be described. As shown in FIGS. 6 and 7, the switch 5 disposed in the side surface of the insertion portion 1B of the adaptor 1 is set at either of two positions, i.e., a position 5A or a position 5B. When the switch 5 is at the position 5A, for example, 14.4 V is outputted without being converted by the adapter 1; that is, the battery voltage is outputted as it stands. Meanwhile, when the switch 5 is at the position 5B, for example, 12 V is outputted by being converted by the adaptor 1. The switch 5 has an erroneous insertion preventing function for preventing the adaptor 1 from being connected to the electric tool with the rated voltage of 12 V, that is, the electric tool with a rated voltage lower than 14.4 V when the switch 5 is set to the position 5A (14.4 V).

Figure 8A:
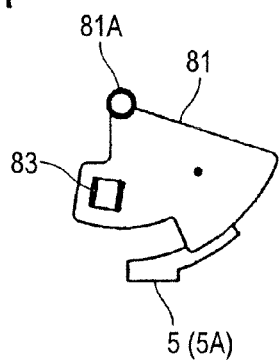
FIGS. 8A, 8B, 8C, and 8D are cross sectional views taken along the line A-A in FIG. 7.
Figure 8B:
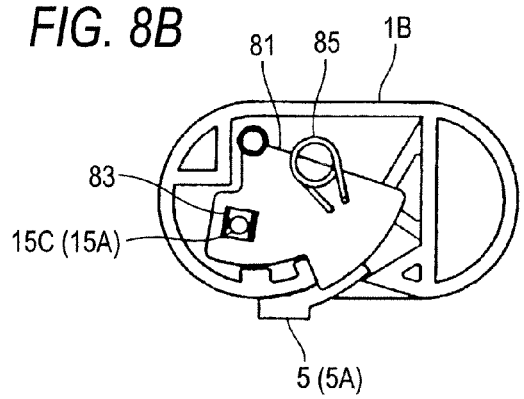
Figure 8C:
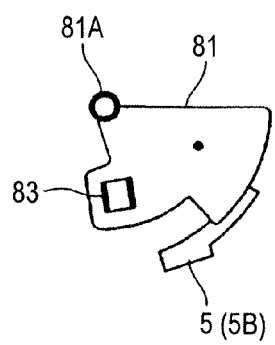

FIGS. 8A-8D is a cross sectional view taken along the line A-A in FIG. 7. As shown in FIGS. 8A-8D, the switch 5 is connected to a rotating portion 81. The rotating portion 81 is a substantially fan-shaped plate having an opening portion 83, and is rotatable at a predetermined angle on a fixed portion 81A corresponding to the center of the fan shape. As shown in FIGS. 8A and 8B, a switch pin 15C provided on the circuit board provided in the adaptor 1 is inserted into the opening portion 83, and the switch pin 15C rotates between the terminal 15A and the terminal 15B as the rotating portion 81 rotates. A spring 85, one end of which is rotatably supported, comes into contact with the rotating portion 81, and the other end of the spring 85 is rotatably supported in the insertion portion 1B to bias the rotating portion 81 toward a predetermined position (positions of the terminal 15A and the terminal 15B).

Figure 8D:
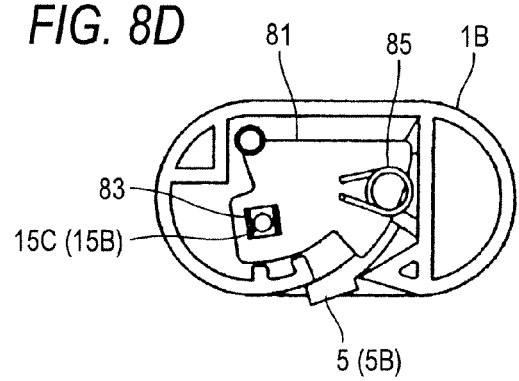

As shown in FIG. 8B, when the switch 15 is at the position connected to the terminal 15A and the switch 5 is set to the position 5A, 14.4 V is output after being converted by the adaptor 1 (in fact, no conversion is performed on the output voltage and the output voltage is equal to the battery voltage of 14.4). As shown in FIG. 8D, when the switch 15 is at the position connected to the terminal 15B and the switch 5 is set to the position 5B, 12 V is output as the converted voltage.

Figure 9:
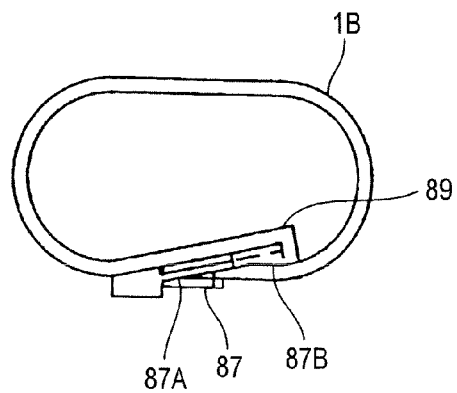
FIG. 9 is a cross sectional view taken along the line A-A in FIG. 7 according to another embodiment.

As shown in FIG. 9, the switch may have another form. The switch 87 shown in FIG. 9 is a slide-type switch and is movable between the position 87A and the position 87B along a rail 89 provided in the insertion portion 1B to set the voltage so as to correspond to the rated voltage of the electric tool. The switch 15 is switched between the terminal 15A and the terminal 15B by a mechanism (not shown). Accordingly, the output voltage can be selected in the same manner as the case in FIGS. 8A-8D.

Figure 10:
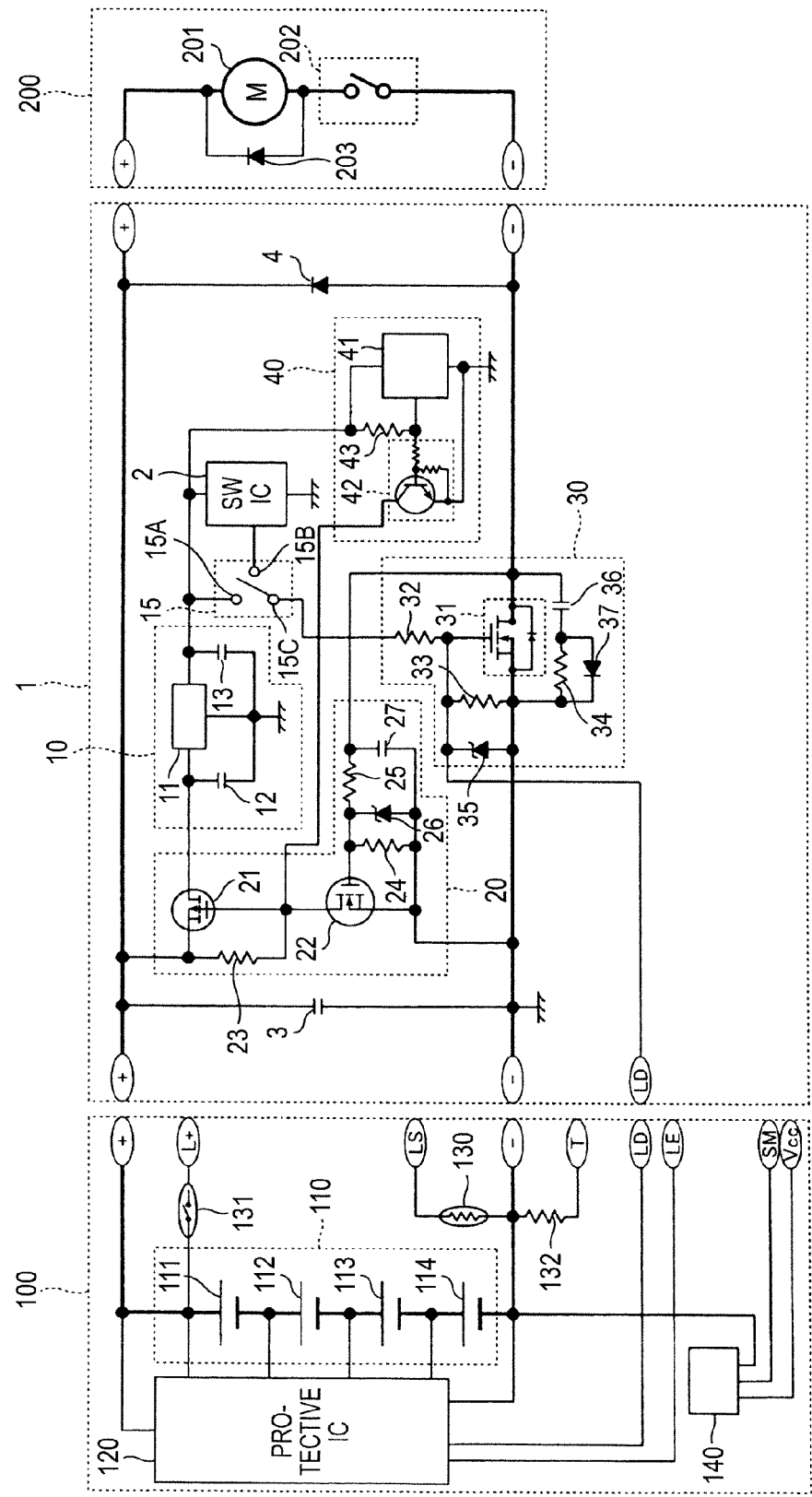
FIG. 10 is a circuit diagram illustrating a use state of the adaptor according to the first embodiment.

Next, the electrical configuration of the adaptor 1 according to the first embodiment, the battery pack 100 and the electric tool 200 for 12 V that are connected to the adaptor 1 will be described. FIG. 10 is a circuit diagram illustrating a connection state of the adaptor 1, the battery pack 100 and the electric tool 200 for 12 V that are connected to the adaptor 1.

As shown in FIG. 10, the battery pack 100 has a battery group 110 including lithium cells 111 to 114, in which four 3.6-volt element cells are connected in series and thus a nominal voltage is 14.4 V. The electric tool 200 is a driving device including a motor 201, a switch 202, and the like. In the present embodiment, the electric tool 200 is a general cordless electric tool for the rated voltage of 12 V.

When the electric tool 200 is used, the adaptor 1 is connected to the battery pack 100 as described above. The adaptor 1 drops the input voltage such as the battery voltage of 14.4 V of the battery pack 100 to convert the input voltage into the voltage of 12 V corresponding to the rated voltage of the electric tool 200. By connecting the adaptor 1 to the electric tool 200 for 12 V, the electric tool 200 is normally operable.

In FIG. 10, the battery pack 100 includes a battery group 110 that is formed of lithium cells 111 to 114, a plus terminal that is connected to a positive electrode of the battery group 100 and a minus terminal that is connected to a negative electrode thereof, a protective IC 120 that monitors each voltage of the lithium cells 111 to 114 of the battery group 110, a thermistor 130 that detects the temperature of the battery group 110, a thermal protector 131 that prevents the temperature from abnormally rising at the charging time, an identification resistor 132 that allows the number of element cells to be identifiable at the charging time, and a battery pack control circuit 140 that memorizes a status of use and a historical trail of use and monitors the charge state of battery pack 100 to output a control signal. Although the plus terminal is provided to be separated into a discharge terminal (+ terminal) and a charge terminal (L+ terminal) in the present embodiment, the terminals may be provided integrally. The battery pack 100 has a current detecting resistor (not shown) that detects a current flowing on the battery group 110. The current detecting resistor, for example, is connected between the plus terminal of the top element cell 111 of the battery group 110 and the plus terminal connected to the positive electrode of the battery group 110, and a potential difference between both terminals is detected by the protective IC to detect the electric current.

The protective IC 120 monitors each voltage of the element cells 111 to 114 constituting the battery group 110, and outputs a discharge stopping signal to an LD terminal for outputting a battery state signal when at least one of the element cells 111 to 114 is overdischarged. In addition, when the above-mentioned current detecting resistor detects that overcurrent flows on the battery group 110, the discharge stopping signal is outputted to the LD terminal. When the battery pack 100 is overcharged at the charging time, a charge stopping signal is outputted to a charger through an LE terminal to stop the charge of the battery pack 100.

The electric tool 200 is an electric tool for a driving voltage of 12 V including the motor 201, the switch 202 connected to the motor 201 in series, and a flywheel diode 203 connected to the motor 201 in parallel.

The adaptor 1 includes a plus terminal that is electrically connected to the plus terminal of the battery pack 100, a minus terminal that is electrically connected to the minus terminal of the battery pack 100, an LD terminal that is electrically connected to the LD terminal outputting the battery state signal of the battery pack 100, and plus and minus terminals (terminals 9 in FIGS. 1 to 3) that are electrically connected to the plus and minus terminals of the electric tool 200, respectively. Further, the adaptor 1 mainly includes a constant-voltage circuit 10, a power supply circuit 20, a switching circuit 30, a power supply maintaining circuit (a power supply maintaining unit) 40, a switching control circuit 2, and a switch 15.

The constant-voltage circuit 10 includes a 3-terminal regulator 10 and capacitors 12 and 13, and converts the battery voltage of the battery pack 100 supplied through the power supply circuit 20, into the power voltages of the switching control circuit 2 and the power supply maintaining circuit 40, for example, a circuit power voltage of 5 V. Even when the battery voltage fluctuates, the stable circuit power voltage such as 5 V can be supplied by the constant-voltage circuit 10.

The power supply circuit 20 includes FETs 21 and 22, resistors 23 to 25, a zener diode 26, and a capacitor 27. When a voltage is applied to a drain terminal of an FET 31 constituting the switching circuit 30 by turning on the switch 202 of the electric tool 200, the FET 22 of the power supply circuit 20 is turned on and thus the FET 21 is turned on by turning on the FET 22, thereby applying the battery voltage to the constant-voltage circuit 10.

The switching circuit 30 includes a FET 31, resistors 32 to 34, a zener diode 35, a capacitor 36, and a diode 37. The resistor 34, the capacitor 36, and the diode 37 constitute a snubber circuit for coping with a reverse electromotive force of the electric tool 200. The switching circuit 30 is connected to a current path between the battery pack 100 and the electric tool 200, that is, between the minus terminals of the battery pack 100 and the electric tool 200. When the signal based on a switching frequency and a switching duty of the switching control circuit 2 is inputted to a gate terminal of the FET 31 of the switching circuit 30, the battery voltage of 14.4 V of the battery pack 100 is converted into the voltage of 12 V corresponding to the electric tool 200. When the discharge stopping signal such as an overdischarge signal and an overcurrent signal of the battery group 110 is inputted from the protective IC 120 of the battery pack 100 to the gate terminal of the FET 31 through the LD terminal, the FET 31 is turn off to cut off the closed circuit between the battery pack 100 and the electric tool 200. In addition, the switching circuit 30 may be connected between the plus terminals of the battery pack 100 and the electric tool 200.

The switching control circuit 2 becomes operable by supplying the circuit power voltage such as 5 V from the constant-voltage circuit 10, thereby controlling the switching frequency and switching duty of the FET 31 of the switching circuit 30. On the basis of the output of the switching control circuit 2, a pulse signal is outputted to the gate terminal of the FET 31 of the switching circuit 30, so that the voltage inputted to the adaptor 1, that is, the battery voltage of the battery pack 100 is converted into a predetermined voltage that can drive the electric tool 200.

The switch 15 is a unit for switching the output voltage and includes a terminal 15A, a terminal 15B, and a switch pin 15C. When the switch pin 15C is connected to the terminal 15A, the voltage conversion is in the off state and the output voltage of the constant-voltage circuit 10 such as 5 V is inputted to the switching circuit 30, thereby continuously turning on the FET 31. When the switch pin 15C is connected to the terminal 15B, the voltage conversion is in the on state and a predetermined pulse signal is inputted from the switching control circuit 2 to the switching circuit 30, thereby turning on and off the FET 31 at a predetermined duty. That is, in the present embodiment, the voltage of 14.4 V is outputted to the electric tool 200 when the switch pin 15C is connected to the terminal 15A, and the voltage of 12 V is outputted due to the voltage conversion when the switch pin 15C is connected to the terminal 15B. In addition, the state corresponds to FIGS. 8A and 8B when the switch pin 15C is connected to the terminal 15A, and the state corresponds to FIGS. 8C and 8D when the switch pin 15C is connected to the terminal 15B.

The power supply maintaining circuit 40 includes a counter IC 41, a transistor 42, and a pull-up resistor 43. When the switch 202 of the electric tool 200 is turned on, the circuit power voltage such as 5 V is supplied to the switching circuit 2 and the power supply maintaining circuit 40 through the power supply circuit 20 and the constant-voltage circuit 10, and the transistor 42 is turned on. Since a GND level signal is inputted to the gate terminal of the FET 21 of the power supply circuit 20 for the time of turning on the transistor 42, the FET 21 is kept turned on.

The counter IC 41 counts the time when the electric power is supplied from the power supply circuit 20, and outputs a signal for turning off the transistor 42 after a predetermined time. When the transistor 42 is turned off and thus the power supply circuit 20 is turned off, the supply of the electric power of the switching control circuit 2 and the power supply maintaining circuit 40 is cut off. That is, after the electric tool 200 is operated, only inner circuit such as the power supply circuit 20 of the adaptor 1 is operated for a predetermined time. After the predetermined time, the transistor 42 is turn off and thus the power supply circuit 20 is turn off. Accordingly, in order to turn on the power supply circuit 20, the switch 202 of the electric tool 200 is required to be turned on again.

The capacitor 3 is provided to remove noises, and the flywheel diode 4 is provided to cope with the reverse electromotive force of the electric tool 200.

Next, the state where the battery pack 100 is connected to the electric tool 200 with the adaptor 1 interposed therebetween will be described.

First, the voltage to be converted is selected depending on the position of the switch 5. In the present embodiment, since the output voltage of 14.4 V of the battery pack 100 is converted into the rated voltage 12 V of the electric tool 200, the switch 5 is set to the position 5B to connect the switch pin 15C to the terminal 15B. In this state, when the switch 202 of the electric tool 200 is turned on, the voltage is applied to the drain terminal of the FET 31 constituting the switching circuit 30. Since the voltage is applied to the gate terminal of the FET 22 of the power supply circuit 20, the FET 22 is turned on and thus the FET 21 is also turned on. Consequently, the battery voltage is supplied to the constant-voltage circuit 10.

When the power voltage (battery voltage) is supplied to the constant-voltage circuit 10, the constant-voltage circuit 10 converts the power voltage into the circuit power voltage such as 5 V; supplies the converted voltage to the switching control circuit 2 and the power supply maintaining circuit 40; and turns on the transistor 42. When the transistor 42 is turned on, the GND level signal is inputted to the gate terminal of the FET 21 of the power supply circuit 20. Accordingly, the FET 21 is kept turned on for the time of turning on the transistor 42.

When the circuit power voltage such as 5 V is applied to the switching control circuit 2, the voltage conversion is performed in the case where the switch 15 is connected to the terminal 15B by setting the switch 5 to the position 5B. Accordingly, the signal based on the switching frequency and the switching duty of the switching control circuit 2 is inputted to the gate terminal of the FET 31 of the switching circuit 30 through the switch 15. Since the rated voltage of the electric tool 200 is 12 V in the present embodiment, the voltage is dropped from the nominal voltage of 14.4 V of the battery pack 100 to 12 V (effective voltage). Accordingly, the switching control circuit 2 outputs the pulse signal to the gate terminal of the FET 31 of the switching circuit 30 at the duty of 12 V/14.4 V=83% at a predetermined frequency and switches the FET 31. Since the converted pulse signal is repeatedly turned on and off at the duty of 83%, the effective voltage is dropped to convert 14.4 V into 12 V; the voltage with the effective value of 12 V is supplied to the electric tool 200 through the plus terminal and the minus terminal of the adaptor 1; the motor 201 is rotated; and thus the electric tool 200 is driven.

When the switch 15 is connected to the terminal 15A by setting the switch 5 to the position 5A, the FET 31 is continuously turned on (duty: 100%). Accordingly, the output voltage of 14.4 V of the battery pack 100 as it stands is outputted between the plus terminal and the minus terminal.

When the switch 202 of the electric tool 200 is turned off, the voltage is not supplied to the motor 201, thereby stopping the motor 201. In the adaptor 1, since the circuit power voltage such as 5 V is continuously supplied from the battery pack 100 to the power supply maintaining circuit 40 through the power supply circuit 20 and the constant-voltage circuit 10, the transistor 42 is turned on. Since the counter IC 41 counts the time after the circuit power voltage is supplied from the power supply circuit 20, the transistor 42 is kept turned on until a predetermined time elapses. Accordingly, the power supply circuit 20 and the constant-voltage circuit 10 are driven. When the predetermined time elapses, the power supply maintaining circuit 40 (counter IC 41) outputs the signal for turning off the transistor 42 to the transistor 42; the power supply circuit 20 is turned off by turning off the transistor 42; and thus the electric power supplied from the battery pack 100 to the adaptor 1 is cut off.

(Power Saving Function)

In the present embodiment, a power saving function is provided so that the energy of the battery pack 100 described above is not unnecessarily consumed. That is, the counter IC 41 counts the time when the circuit power voltage is supplied from the power supply circuit 20, and then outputs the signal for turning off the transistor 42 after a predetermined time. Since the transistor 42 is turned off and thus the power supply circuit 20 is turned off, the electric power supplied to the switching control circuit 2 and the power supply maintaining circuit 40 is cut off. Accordingly, when the switch 202 of the electric tool 200 is turned off or the electric tool 200 is disconnected, the circuit operation is restricted in the adaptor 1 to suppress the power consumption of the battery pack 100. That is, after the electric tool 200 is operated, only inner circuit such as the power supply circuit 20 of the adaptor 1 is operated for a predetermined time. After the predetermined time, the transistor 42 is turn off and thus the power supply circuit 20 is turn off, thereby realizing the power saving.

(Overdischarge Preventing Function and Overcurrent Preventing Function)

In the present embodiment, the protective IC 120 of the battery pack 100 has an overdischarge detecting function and an overcurrent detecting function as described above. In addition, the protective IC 120 also has an overcharge detecting function at the charging time. The protective IC 120 of the battery pack 100 monitors the overdischarge of the battery group 110 by detecting each of battery voltages of the lithium cells 111 to 114. When any one of the detected voltages is lower than a predetermined value, the overdischarge signal is outputted to the adaptor 1 through the LD terminal. The protective IC 120 monitors the overcurrent by detecting the electric current of the battery group 110 detected by a current detecting resistor (not shown). When the detected current is higher than a predetermined value, the overcurrent signal is outputted to the adaptor 1 through the LD terminal. When the overdischarge signal or the overcurrent signal as the discharge stopping signal is inputted to the gate terminal of the FET 31 of the switching circuit 30 through the LD terminal, the FET 31 is turned off to open the closed circuit between the battery pack 100 and the electric tool 200, thereby cutting off the electric power supplied to the electric tool 200.

Since the overdischarge or overcurrent of the battery pack 100 can be prevented due to the overdischarge preventing function and the overcurrent preventing function, the abnormal operation such as the abnormal heating of the battery pack 100 and the lock of the motor 202 can be prevented and the breakdown or decrease in life of the battery pack 100 can be prevented.

As described above, the electric tool 200 according to the present embodiment use the insertion-type battery pack as the driving source in the case where the battery pack is directly connected thereto. Accordingly, in order to use the slide-type battery pack 100, the battery pack 100 is connected thereto through the insertion-type adaptor 1, as described above.

As specifically described above, according to the battery pack 100, the adaptor 1, and the electric tool 200 of the first embodiment, the electric tool 200 can be driven by the battery pack 100 by interposing the adaptor 1 therebetween, even when the insertion type of the electric tool 200 is different from that of the battery pack 100 or the driving voltage of the electric tool 200 is different from the output voltage of the battery pack 100. Further, since there are provided the power saving function; the overdischarge preventing function; and the overcurrent preventing function, it is possible to use the electric tool 200 in a safe and efficient manner.

First Modified Example of First Embodiment

Figure 11:
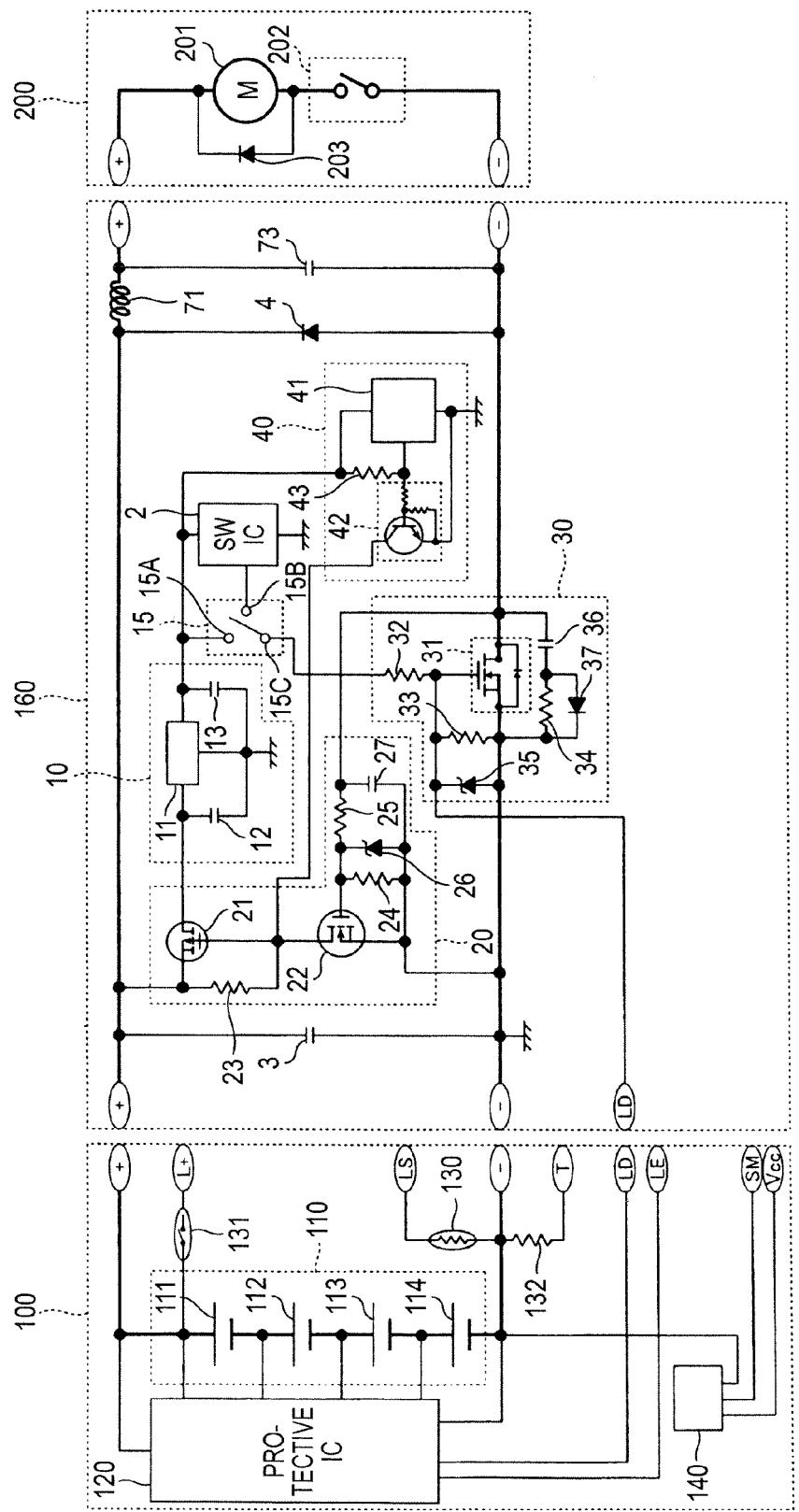
FIG. 11 is a circuit diagram illustrating a use state of an adaptor according to a first modified example of the first embodiment.

Hereinafter, a first modified example of the first embodiment according to the invention will be described in detail with reference to FIG. 11. The same reference numeral is given to the component having the same configuration and operation as the first embodiment, and the description thereof is omitted.

The configuration in appearance of an adaptor 160 is substantially the same as the adaptor 1. In this example, the electrical configuration of the adaptor 160, the battery pack 100 and the electric tool 200 for 12 V that are connected to the adaptor 160 will be described. FIG. 11 is circuit diagram illustrating a connection state of the adaptor 160, the battery pack 100 and the electric tool 200 for 12 V that are connected to the adaptor 160.

Differences between the adaptor 1 and the adaptor 160 are that an inductor 71 is disposed between the plus terminal of the battery pack 100 and the plus terminal of the electric motor 200, and a capacitor 72 is disposed between the plus terminal and the minus terminal of the electric tool 200. The inductor 71 and the capacitor 72 are provided so that the pulse-shaped voltage waveform to the electric tool 200 is smoothed. The pulse-shaped voltage waveform converted in the same manner as the case of the adaptor 1 is smoothed by the inductor 71 and the capacitor 72, the smoothed voltage as the substantially DC voltage of 12 V is supplied to the electric tool 200 through the plus and minus terminals of the adaptor 160, the motor 201 is rotated, and thus the electric tool is driven.

As described above, according to the adaptor 160 of the first modified example of the first embodiment, the battery pack 100 and the electric tool 200 that are connected to the adaptor 160, the voltage can be supplied more stably and the motor 201 can be controlled more precisely or can be controlled in another manner, in addition to the advantage of the first embodiment. For example, it is possible to control the phase of the motor 201 or to light a fluorescent lamp for lighting during the working time.

Second Modified Example of First Embodiment

Figure 12:
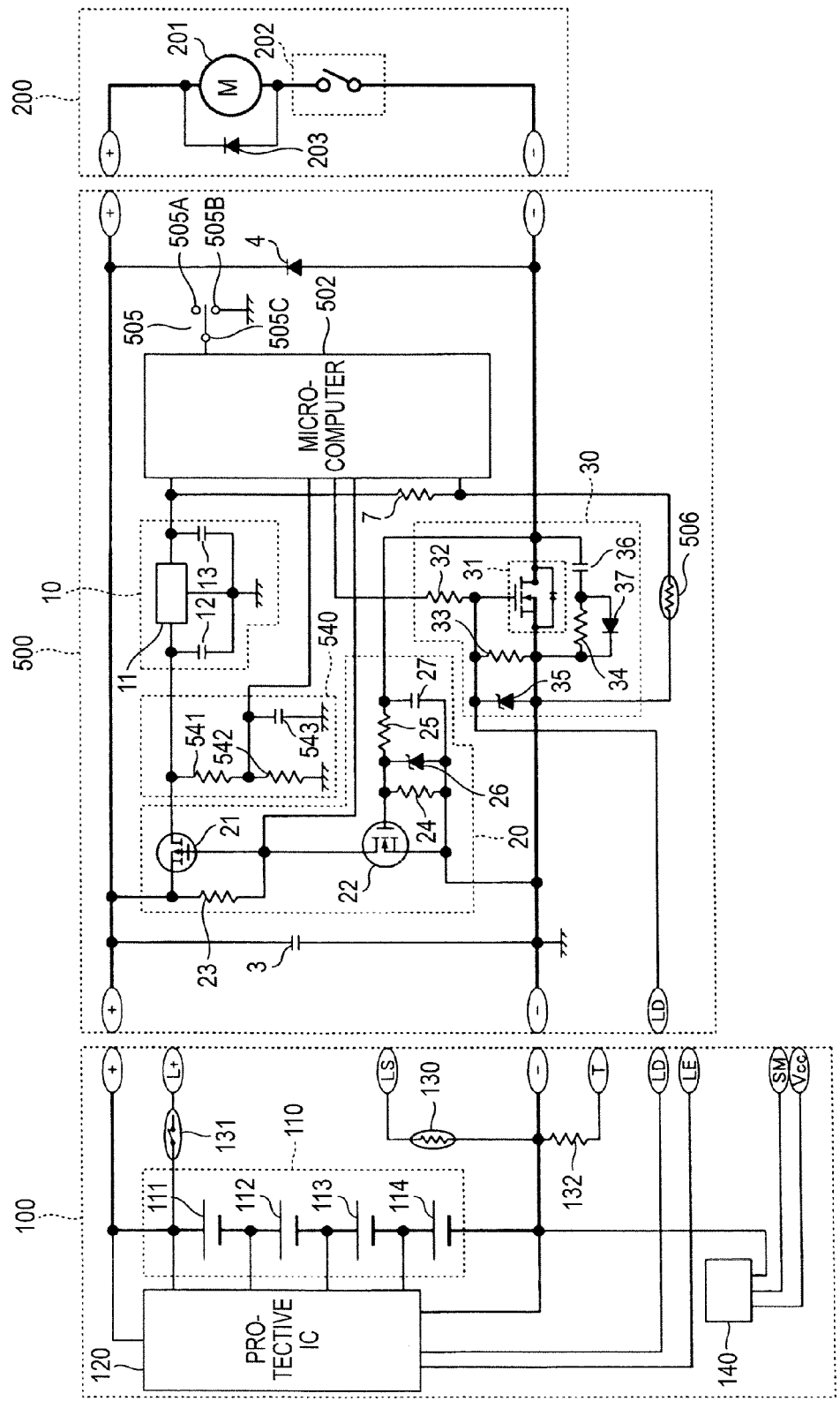
FIG. 12 is a circuit diagram illustrating a use state of an adaptor according to a second modified example of the first embodiment.
Figure 13:
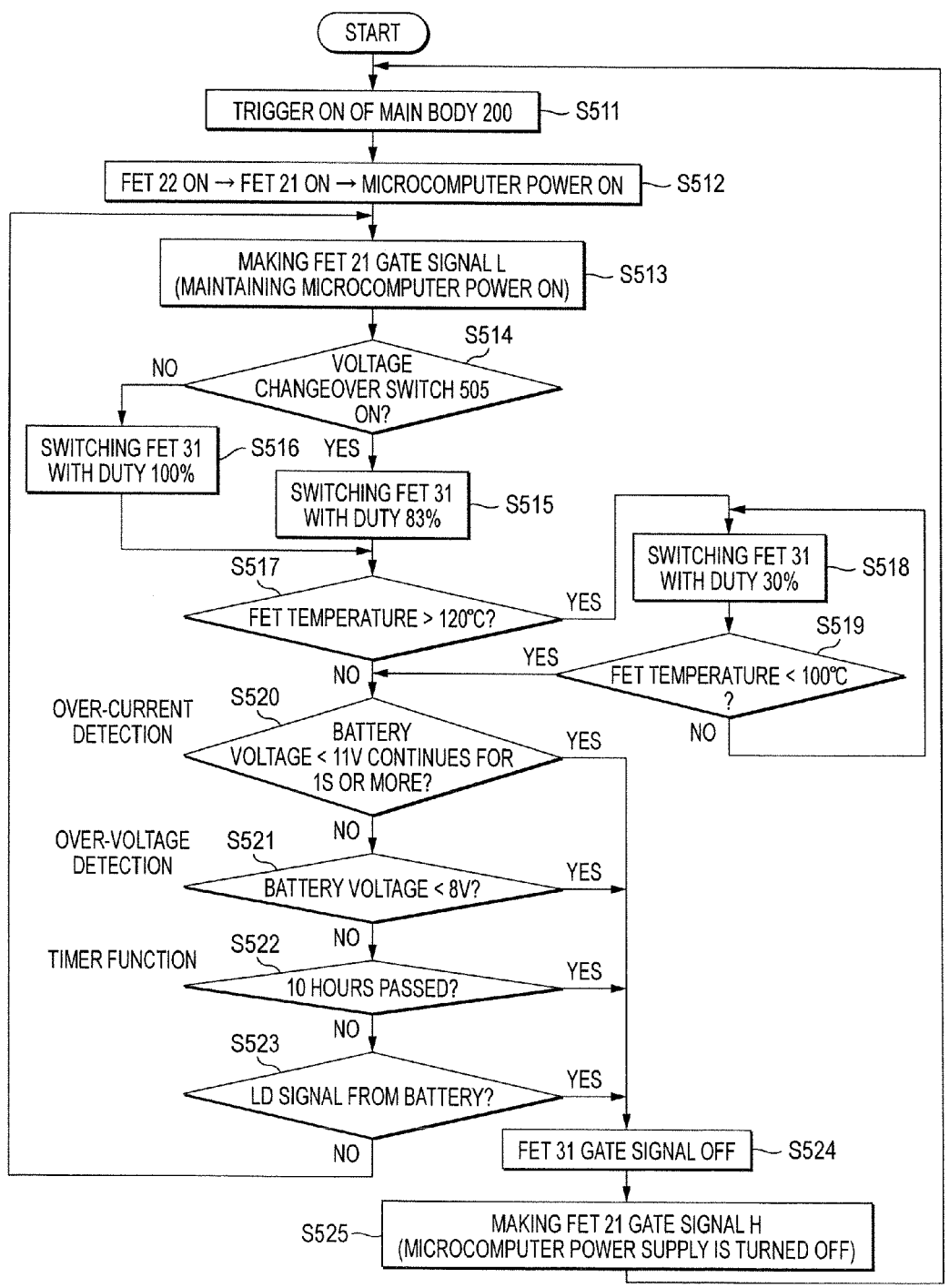
FIG. 13 is a flowchart illustrating a use state of the adaptor according to the second modified example.

Hereinafter, a second modified example of the first embodiment according to the invention will be described in detail with reference to FIGS. 12 and 13. The same reference numeral is given to the component having the same configuration and operation as the first embodiment or the first modified example of the first embodiment, and the description thereof is omitted.

The configuration in appearance of an adaptor 500 is substantially the same as the adaptor 1 and the adaptor 160. The adaptor 500 is a device for mechanically and electrically connecting the electric tool 200 to the battery pack 100 outputting the voltage different from the rated voltage of the electric tool 200. The adaptor 500 is connectable to the battery pack 100 in the sliding manner and is connectable to the electric tool 200 in the insertion manner. Further, the adaptor 500 converts the output voltage of the battery pack 100 into the rated voltage of the electric tool 200 and supplies the converted voltage, and thus the electric tool 200 can be driven by the battery pack 100.

In this example, the electrical configuration of the adaptor 500, the battery pack 100 and the electric tool 200 for 12 V that are connected to the adaptor 500 will be described. FIG. 12 is a circuit diagram illustrating a connection state of the adaptor 500, the battery pack 100 and the electric tool 200 for 12 V that are connected to the adaptor 500. The battery pack 100 and the electric tool 200 are the same as the first embodiment, and thus the description there is omitted.

The adaptor 500 drops the input voltage such as the battery voltage of 14.4 V of the battery pack 100 to convert the input voltage into the voltage of 12 V corresponding to the rated voltage of the electric tool 200.

The adaptor 500 includes the plus terminal that is electrically connected to the plus terminal of the battery pack 100, the minus terminal that is electrically connected to the minus terminal of the battery pack 100, the LD terminal that is electrically connected to the LD terminal outputting the battery state signal of the battery pack 100, the plus and minus terminals that are electrically connected to the plus and minus terminals of the electric tool 200, respectively. Further, the adaptor 500 mainly includes the constant-voltage circuit 10, the power supply circuit 20, the switching circuit 30, a power voltage detecting circuit 540, a microcomputer 502, a switch 505, and a thermistor 506. Differences between the adaptor 1 and the adaptor 500 are that the microcomputer 502 is provided instead of the switching control circuit 2; the switch 505 selecting whether the voltage conversion is performed or not is provided instead of the switch 15; the power supply maintaining circuit 40 and the function thereof is performed by the microcomputer 502; and the battery voltage detecting circuit 540 for detecting the voltage of the battery pack 100 and the thermistor 506 for detecting the temperature of the FET 31 are additionally provided.

When a voltage is applied to a drain terminal of an FET 31 constituting the switching circuit 30 by turning on the switch 202 of the electric tool 200, the FET 22 of the power supply circuit 20 is turned on and thus the FET 21 is turned on. Accordingly, the power supply circuit 20 supplies the battery voltage to the battery voltage detecting circuit 540 and the constant-voltage circuit 10.

The battery voltage detecting circuit 540 includes resistors 541 and 542 that are connected in series between the plus terminal and the ground line and a capacitor 543 for preventing noises that is connected to the resistor 542. The battery voltage detecting circuit 540 divides the battery voltage of the battery pack 100 by the resistor 541 and the resistor 542 and outputs the voltage of the resistor 542 to the microcomputer 502.

The constant-voltage circuit 10 converts the battery voltage of the battery pack 100 supplied through the power supply circuit 20, into the power voltage of the microcomputer 502, for example, the circuit power voltage of 5 V. The switching circuit 30 is connected between the minus terminal of the battery pack 100 and the minus terminal of the electric tool 200. When the signal based on a switching frequency and a switching duty of the microcomputer 502 is inputted to the gate terminal of the FET 31 of the switching circuit 30, the battery voltage of 14.4 V of the battery pack 100 is converted into the voltage of 12 V corresponding to the electric tool 200. When the discharge stopping signal is inputted from the protective IC 120 of the battery pack 100 to the gate terminal of the FET 31 through the LD terminal, the FET 31 is turn off to cut off the closed circuit between the battery pack 100 and the electric tool 200. In addition, the switching circuit 30 may be connected between the plus terminals of the battery pack 100 and the electric tool 200.

The switch 505 is connected to the microcomputer 502 and selects whether the voltage conversion is performed or not. When the voltage conversion of the battery pack 100 is not performed, the switch pin 505C of the switch 505 is connected to the terminal 505A of the constant voltage such as 5 V by setting the switch 5 to the position 5A (FIG. 6). When the battery voltage of the battery pack 100 is converted into a predetermined voltage such as 12 V and outputs the converted voltage to the electric tool 200, the switch 505 is connected to the terminal 505B connected to the ground line by setting the switch 5 to the position 5B. At this time, the microcomputer 502 detects the state of the switch 505.

The thermistor 506 detects the temperature of the FET 31, the output voltage such as 5 V of the constant-voltage circuit 10 is divided by the resistor 7 and thermistor 506, and the divided voltage value is outputted to the microcomputer 502.

When the switch 202 of the electric tool 200 is turned on, the microcomputer 502 is operable by supplying the circuit power voltage such as 5 V through the power supply circuit 20, the battery voltage detecting circuit 540, and the constant-voltage circuit 10. Accordingly, the GND level signal is inputted to the gate terminal of the FET 21 of the power supply circuit 20, thereby keeping the FET 21 turned on. The microcomputer 502 controls the switching frequency and the switching duty of the FET 31 of the switching circuit 30 on the basis of the state of the switch 505. That is, when the switch 505 is connected to the terminal 505A, the voltage conversion is not performed. Accordingly, the signal at the duty of 100% is outputted to the FET 31 of the switching circuit 30. When the switch 505 is connected to the terminal 505B, the battery voltage is converted into a predetermined voltage (12 V) that can drive the electric tool 200. Accordingly, the pulse signal (duty: 83%) is outputted to the gate terminal of the FET 31 of the switching circuit 30.

The microcomputer 502 controls the switching duty on the basis of the detected temperature by monitoring the temperature of the FET 31. When the overcurrent or the overdischarge is detected by monitoring the battery voltage detected by the battery voltage detecting circuit 540, the microcomputer 502 turns off the gate signal of the FET 31 to cut off the closed circuit between the battery pack 100 and the electric tool 200. In addition, the microcomputer 502 counts the time when the electric power is supplied from the power supply circuit 20, and then the signal for turning off the FET 21 is outputted after a predetermined time. When the power supply circuit 20 is turned off, the electric power supplied to the microcomputer 502 is cut off.

Hereinafter, the operation of the battery pack 100, the adaptor 500, and the electric tool 200 will be described with reference to a flowchart in FIG. 13. The switch 202 that is the trigger of the electric tool 200 body is turn on (Step 511). When the switch 202 of the electric tool 200 is turned on, the voltage is applied to the drain terminal of the FET 31 constituting the switching circuit 30. Since the voltage is applied to the gate terminal of the FET 22 of the power supply circuit 20, the FET 22 is turned on and thus the FET 21 is also turned on due to the turning-on of the FET 22. Accordingly, the battery voltage is supplied to the constant-voltage circuit 10. When the power voltage is supplied to the constant-voltage circuit 10, the constant-voltage circuit 10 converts the power voltage into the circuit power voltage such as 5 V and supplies the converted voltage to the microcomputer 502 (Step 512). When predetermined voltage is inputted from the power supply voltage detection circuit 540 to the microcomputer 502, the microcomputer 502 inputs the GND (L) level signal to the gate terminal of the FET 21 of the power supply circuit 20, thereby keeping the FET 21 turned on (Step 513).

When the circuit power voltage such as 5 V is inputted, the microcomputer 502 judges whether the voltage switching switch 505 is in the voltage conversion state (on state) or not (Step 514). When the voltage inputted from the switch 505 is in the ground level (connected to the terminal 505B), in the present embodiment the microcomputer 502 outputs the pulse signal at the duty of 83% at a predetermined frequency to switch the FET 31 so that the output voltage (14.4 V) of the battery pack 100 is converted into the driving voltage (12 V) of the electric tool 200 (Step 515). When the voltage inputted from the switch 505 is, for example, 5 V, the microcomputer 502 judges that the voltage conversion is not performed and outputs the pulse signal at the duty of 100% at a predetermined frequency to switch the FET 31 (Step 516).

Since the temperature of the FET 31 rises due to the switching of the FET 31 and thus the FET 31 may break, the temperature of the FET 31 is detected by the thermistor 506 (Step 517). When the temperature of the FET 31 detected by the thermistor 506 is equal to or lower than 120° C., the process is transferred to Step 520 (Step 517: No). When the temperature is higher than 120° C. (Step 517: Yes), the switching duty is reduced to 30% to suppress the rising of the temperature of the FET 31 (Step 518). When the temperature of the FET 31 is equal to or higher than 100° C., Step 518 is repeated (Step 519: No). When the temperature of the FET 31 is lower than 100° C. (Step 519: Yes), the process is transferred to Step 520.

In Step 520, the overcurrent detection is performed. That is, when the battery voltage detecting circuit 540 detects that a state where the battery voltage is lower than 11 V is continued for one or more second(s) (Step 520: Yes), the process is transferred to Step 524. Otherwise, the process is transferred to Step 521 (Step 520: No).

In Step 521, the overdischarge detection is performed. That is, when the battery voltage detecting circuit 540 detects that the battery voltage is lower than 8 V (Step 521: Yes), the process is transferred to Step 524. Otherwise, the process is transferred to Step 522 (Step 521: No).

In Step 522, the power saving function is performed. That is, when the circuit power voltage starts to be supplied to the microcomputer 502 of the adaptor 500 (the switch 202 is turned on once) and then 10 hours elapse (Step 522: Yes), the process is transferred to Step 524. Otherwise, the process is transferred to Step 523 (Step 522: No).

In Step 523, it is judged whether the LD signal is inputted from the LD terminal of the battery pack 100 or not. As described above, the battery pack 100 has the overdischarge preventing function and the overcurrent preventing function. When the any one of the overdischarge or the overcurrent is detected, the overdischarge signal or the overcurrent signal is outputted as the discharge stopping signal through the LD terminal. When the discharge stopping signal is inputted (Step 523: Yes), the process is transferred to Step 524. Otherwise, the process returns to Step 513 (Step 523: No).

In Step 524, the gate signal of the FET 31 is cut off, the gate signal of the FET 21 is turned to H, the power supply of the microcomputer 520 is cut off (Step 525), and then the process returns to Step 511.

Since the overcurrent detection (Step 520 and Step 523) and the overdischarge detection (Step 521 and Step 523) are performed by both of the battery voltage detecting circuit 540 and the protective circuit IC 120, the contact of the LD terminal is unnecessary. Even when the discharge stopping signal is not inputted from the protective IC 120 to the adaptor 500, the overcurrent and the overdischarge can be securely prevented due to the detection of the battery voltage detecting circuit 540.

The voltage of 12 V converted by the adaptor 500 as described above is supplied to the electric tool 200 through the plus and minus terminals of the adaptor 500, and thus the motor 201 is rotated to drive the electric tool 200. In addition, the overdischarge and the overcurrent can be securely prevented.

When the switch 202 of the electric tool 200 is turn off, the voltage is not supplied to the motor 201 and thus the motor 201 is stopped. In the adaptor 500, the circuit power voltage such as 5 V is continuously supplied from the battery pack 100 to the microcomputer 502 through the power supply circuit 20 and the constant-voltage circuit 10. The microcomputer 502 counts the time after the circuit power voltage is supplied from the power supply circuit 20. Accordingly, the FET 21 is kept turned on until a predetermined time elapses, thereby driving the power supply circuit 20 and the constant-voltage circuit 10. After the predetermined time, the microcomputer 502 outputs the signal for turning off the FET 21 to cut off the power supply circuit 20. Accordingly, the electric power supplied from the battery pack 100 to the adaptor 500 is cut off.

(Overcurrent Preventing Function and Overdischarge Preventing Function)

In the present embodiment, the microcomputer 502 has the overcurrent detecting function and the overdischarge detecting function as described above. The microcomputer 502 monitors the overcurrent and the overdischarge by detecting the battery voltage of the battery pack 100 detected by the battery voltage detecting circuit 540. When a state where the detected voltage is lower than a predetermined value such as 11 V is continued for one or more second(s), the microcomputer 502 judges that the overcurrent occurs. When the detected voltage is lower than a predetermined value such as 8 V, the microcomputer 502 judges that the overdischarge has occurred. When the microcomputer 502 judges that the overdischarge or the overdischarge occurs, the turning-off signal is inputted to the gate terminal of the FET 31 of the switching circuit 30; the closed circuit between the battery pack 100 and the electric tool 200 is opened; and thus the electric power supplied from the battery pack 100 to the electric tool 200 is cut off. Then, the microcomputer 502 turns the gate signal of the FET 21 to H and thus the power supply circuit 20 is turned off, thereby the electric power supplied from the battery pack 100 to the adaptor 500 is cut off. Accordingly, the power supply of the microcomputer 502 is cut off. In addition, the protective IC 120 of the battery pack 100 also detects the overcurrent and the overdischarge as described above.

Since the overdischarge and the overcurrent of the battery pack 100 can be prevented by the overdischarge preventing function and the overcurrent preventing function, the abnormal operation such as the abnormal heating of the battery pack 100 and the lock of the motor 202 can be prevented and the breakdown or the decrease in life of the battery pack 100 can be prevented.

(Power Saving Function)

In the present embodiment, the microcomputer 502 is provided with a power saving function so that the energy of the battery pack 100 described above is not unnecessarily consumed. That is, the microcomputer 502 counts the time when the circuit power voltage is supplied from the power supply circuit 20, and then outputs the signal for turning off the FET 21 after a predetermined time such as 10 hours elapses (after the trigger 202 is turned on once). Accordingly, the power supply circuit 20 is cut off and thus the electric power supplied to the microcomputer 502 is cut off.

Accordingly, when the switch 202 of the electric tool 200 is turned off or the electric tool 200 is disconnected and when the switch 202 of the electric tool 200 is turned on once and a predetermined time elapses, the circuit operation is restricted in the adaptor 500 to suppress the power consumption of the battery pack 100. That is, after the electric tool 200 is operated, only inner circuit such as the power supply circuit 20 of the adaptor 500 is operated for a predetermined time. After the predetermined time, the FET 31 is turn off; the FET 21 is turned off; and thus the power supply circuit 20 is turn off, thereby realizing the power saving.

The overcurrent may be mis-detected depending on how to use the electric tool 200. That is, when the electric tool is used in a state where the switch 202 is half-pulled (torque drops) for a predetermined time, the variation in voltage (battery voltage) of the plus terminal occurs and thus the current value detected by the current detecting resistor of the battery pack 100 is varied. As a result, the protective IC 120 mis-detects the overcurrent, the discharge stopping signal is outputted through the LD terminal, and then the FET 31 is turned off. Since the battery voltage detecting circuit 540 also detects the overcurrent, the invention may be configured as follows. That is, even when the discharge stopping signal is outputted from the LD terminal, the signal outputted from the LD terminal is ignored when the battery voltage detected by the battery voltage detecting circuit 540 is equal to or higher than a predetermined value. Then, the signal for keeping the FET 31 turned on may be outputted from the microcomputer 502.

As specifically described above, according to the battery pack 100, the adaptor 500, and the electric tool 200 of the second modified example of the first embodiment, the electric tool 200 can be driven by the battery pack 100 by interposing the adaptor 500 therebetween, even when the insertion type of the electric tool 200 is different from that of the battery pack 100 or the driving voltage of the electric tool 200 is different from the output voltage of the battery pack 100. Since the output voltage can be selected by the switch 5, the voltage that is higher than the rated voltage of the electric tool 200 can be prevented from being inputted. Since the microcomputer 502 of the adaptor 500 also has the power saving function, the overdischarge preventing function, and the overcurrent preventing function as well as the battery pack 100 does, the electric tool 200 can be used in a more safer and efficient manner.

Figure 21:
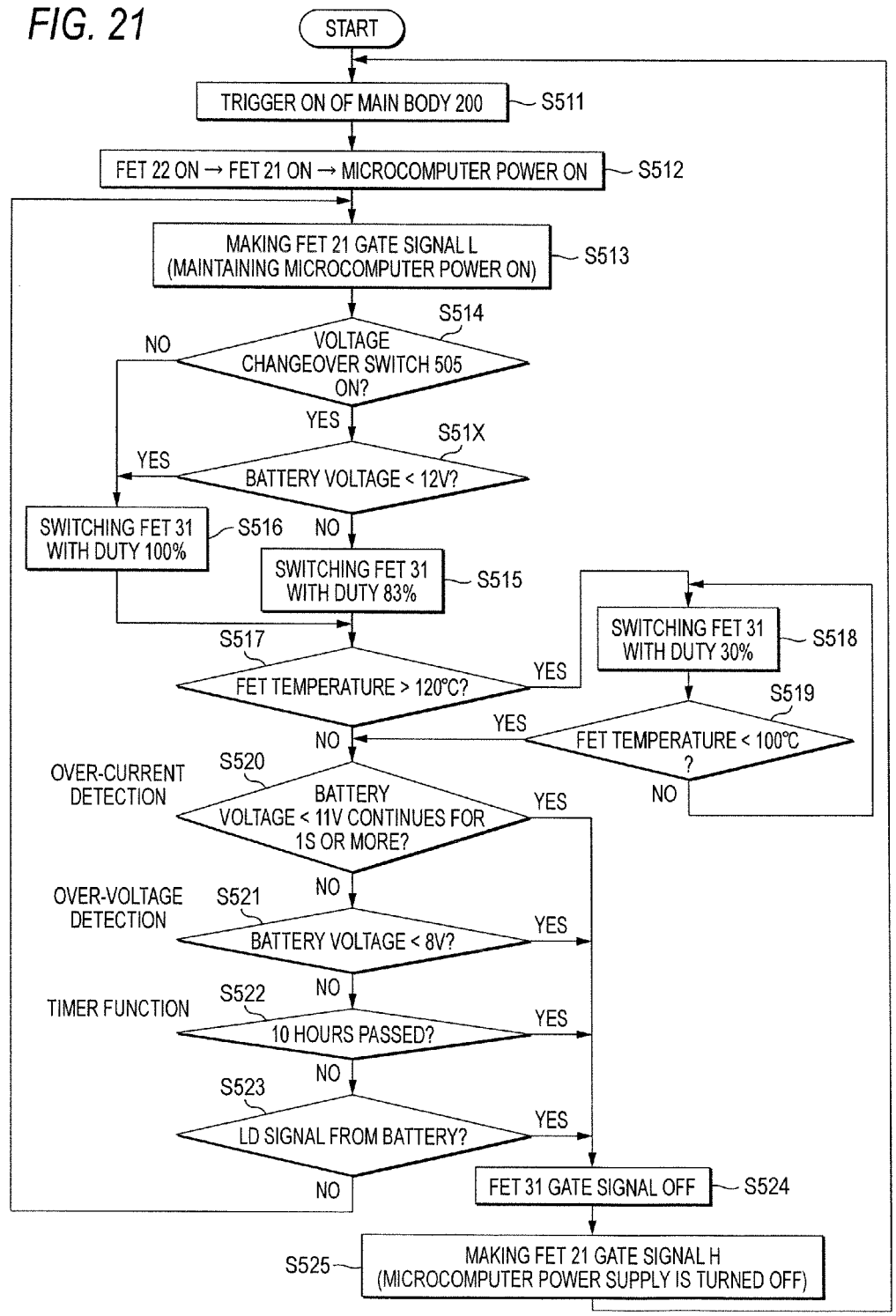
FIG. 21 is a second modification example of the first embodiment.

A second modification example of the above-described first embodiment may be operated as shown in FIG. 21. A flow chart shown in FIG. 21 is roughly the same as the flow chart shown in FIG. 13, but they are different in that, when it is judged that the voltage changeover switch 505 is in an ON state in the step 514 (Yes in the step 514), the step 515 is not executed immediately, but a step 51X for judging whether battery voltage is larger than 12V or not is added. Hereinafter, operations of the added step 51X, before and after the same are explained. Operations of other portions are the same as those in the flow chart shown in FIG. 13, and the same step numbers are given to them.

Figure 22:
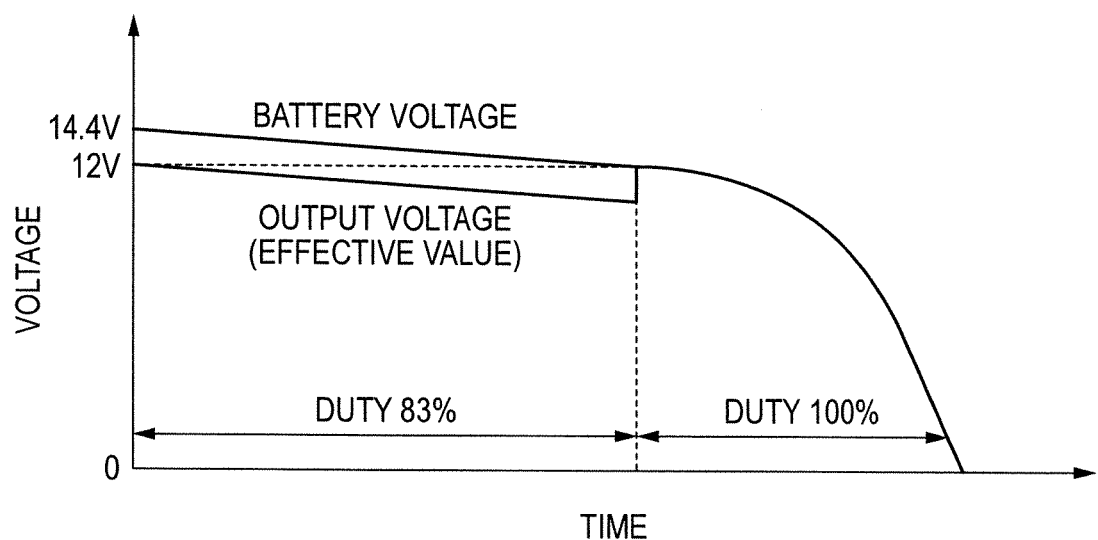
FIG. 22 is a graph showing a relationship between an output voltage applied to the driving device and a voltage of the battery pack.

The microcomputer 502, when circuit power supply voltage of e.g., 5V is inputted thereto, judges whether the voltage changeover switch 505 is in a state of executing voltage conversion (ON state) or not (step 514), and when input voltage from the switch 505 is e.g., 5V, the microcomputer 502 judges that voltage conversion should not be carried out, and outputs a pulse signal of predetermined frequency and duty 100%, and has FET 31 executed switching (step 516). This point is the same as the operation shown in the flow chart of FIG. 13. However, when an input from the switch 505 is of a ground level, the battery voltage detection unit 540 detects battery voltage, and the microcomputer 502 judges whether or not the battery voltage is a predetermined value or more (step 51X). This point is different from the flow chart shown in FIG. 13. In this embodiment, output voltage 14.4V of the battery pack 100 is converted into drive voltage 12V of the electric power toll 200, and therefore, it is desirable to judge whether or not battery voltage detected by the battery voltage detection unit 540 is 12V or more. When the battery voltage is 12V or more, the microcomputer 502 outputs a pulse signal of predetermined frequency and duty 83%, and has FET 31 executed switching (step 515). That is, as shown in FIG. 22, if the battery voltage is 14.4V, 12V (effective value) is outputted to the electric power tool 200, and if the battery voltage is 12V or more and 14.4V or less, voltage corresponding to 83% of the battery voltage is outputted to the electric power tool 200.

In addition, when the battery voltage is lower than 12V, it goes on to a step 516, and the microcomputer 502 outputs a pulse signal of predetermined frequency and duty 100%, and has FET 31 executed switching. This is because it is not possible to detect an accurate current value in the state of executing switching when protection IC 120 of the battery pack 100 detects over-current, and therefore, when the battery voltage is lower than 12V, the microcomputer 502 judges that there is possibility of the over-current, to enable accurate over-current detection by the protection IC 120 in the state of duty 100%.

In the above explanation, control is performed in a manner that duty 83% of predetermined frequency is outputted when the battery voltage is 12V or more, but it is not restrictive. It is all right even if an optimum duty ratio is calculated to control FET 31, in a manner that an effective value of output voltage from the adaptor 500 becomes 12V while always monitoring the battery voltage by the microcomputer 502, when the battery voltage is 12V or more. In this case, it is possible to always keep the effective vale of the output voltage from the adaptor 500 constant, in an area where the battery voltage is 12V or more, and therefore, even when the battery voltage decreases, it becomes possible to use the electric power tool 200 with stable electric power, without being influenced by the decrease of the battery voltage.

Second Embodiment

Figure 14:
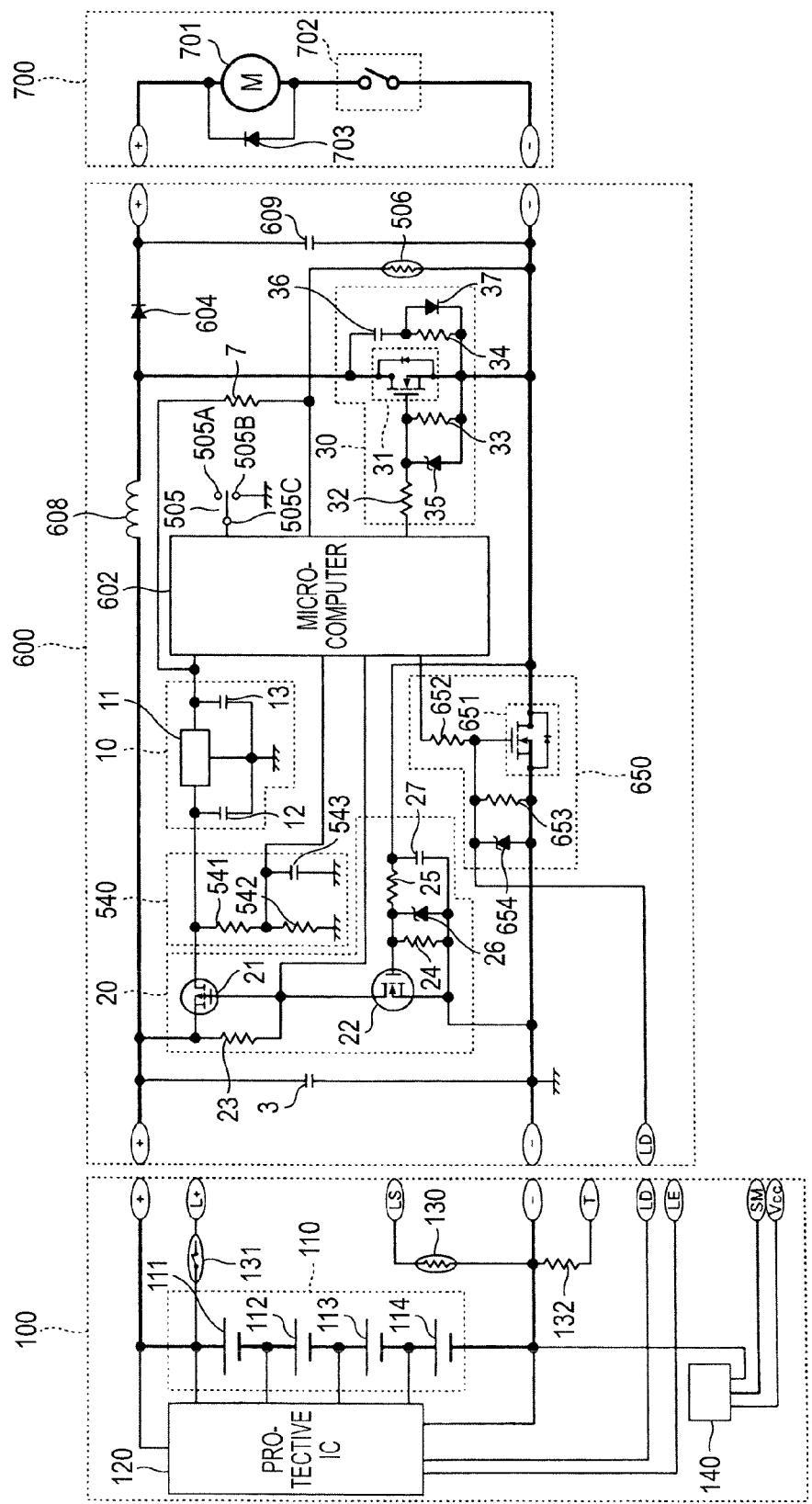
FIG. 14 is a circuit diagram illustrating a use state of an adaptor according to a second embodiment of the invention.

Hereinafter, a second embodiment of the invention will be described in detail with reference to FIG. 14. FIG. 14 is a circuit diagram illustrating a connection state of an adaptor 600 according to the second embodiment, the battery pack 100 and an electric tool 700 that are connected to the adaptor 600. The same reference numeral is given to the component having the same configuration and operation as the first embodiment or the modified examples thereof, and the description thereof is omitted.

The appearance in a use state of the adaptor 600 according to the second embodiment is substantially the same as that of the first embodiment and the first and second modified examples thereof. The adaptor 600 is a device that mechanically and electrically connects the electric tool 700 to the battery pack 100 outputting a lower voltage than a rated voltage of the electric tool 700 to use the electric tool 700. For example, the adaptor 600 is connectable to the battery pack 100 in the sliding manner and is connectable to the electric tool 700 in the insertion manner.

First, the inner configuration when the battery pack 100 is used as the power supply of the electric tool 700 with the adaptor 600 interposed therebetween will be described. The battery pack 100 is the same as that of the first embodiment, and thus the description thereof is omitted. Differences between the electric tool 700 and the electric tool 200 are that the motor 201 of the electric tool 200 is changed to a motor 701, the diode 203 is changed to a diode 703, the switch 202 is changed to a switch 702 and the rated voltage is higher than the output voltage such as 14.4 V of the battery pack 100. However, the fundamental configuration and operation are substantially the same.

The adaptor 600 converts the input voltage into the voltage corresponding to the rated voltage of the electric tool 700 such as the battery voltage of 14.4 V of the battery pack 100 is raised. For this reason, in the adaptor 600 according to the second embodiment, the position B of the switch 5 described in the first embodiment may be a position indicating a voltage value such as 18 V higher than the output voltage of the battery pack 100.

The adaptor 600 includes the plus terminal that is electrically connected to the plus terminal of the battery pack 100, the minus terminal that is electrically connected to the minus terminal of the battery pack 100, the LD terminal that is electrically connected to the LD terminal outputting the battery state signal of the battery pack 100, the plus and minus terminals that are electrically connected to the plus and minus terminals of the electric tool 700, respectively. Further, the adaptor 600 mainly includes the constant-voltage circuit 10, the power supply circuit 20, the switching circuit 30, the battery voltage detecting circuit 540, a microcomputer 602, the switch 505, the thermistor 506, an inductor 608, a diode 604, a capacitor 609, and a stopping signal detecting circuit 650.

Differences between the adaptor 500 and the adaptor 600 are that the voltage raising inductor 608, the capacitor 609, the diode 604 for preventing the capacitor 609 from be discharged, and the stopping signal circuit 650 for turning on or off the switch 702 of the electric tool 700 as performed by the switching circuit 30 and for detecting the discharge stopping signal are provided; the microcomputer 502 is changed to the microcomputer 602; and the switching circuit 30 is provided between the inductor 608 and the minus terminal.

The stopping signal detecting circuit 650 includes an FET 651, a resister 652, a resistor 653, and a zener diode 654. When the switch 702 of the electric tool 700 is turned on and thus the gate signal (on-signal of the FET 651) is supplied from the microcomputer 602, the FET 651 of the stopping signal detecting circuit 650 connects the minus terminal of the battery pack to the minus terminal of the electric tool 700. When the discharge stopping signal is inputted on the basis of the overcurrent preventing function; the overdischarge preventing function; or the power saving function of the microcomputer 602 or the battery pack 100, the FET 651 is turned off. Accordingly, the connection between the minus terminal of the battery pack 100 and the minus terminal of the electric tool 700 is opened, thereby cutting off the electric power supplied from the battery pack 100.

When the switch 702 of the electric tool 700 is turned on; the FET 22 is turned on; and thus the FET 21 is turned on, the power supply circuit 20 supplies the battery voltage to the battery voltage detecting circuit 540 and the constant-voltage circuit 10.

A difference between the microcomputer 502 and the microcomputer 602 is that the discharge stopping signal based on the overcurrent preventing function; the overdischarge preventing function; or the power saving function is outputted not to the switching circuit 30 but to the stopping signal detecting circuit 650. Other than that, the microcomputer 602 performs substantially the same operation as the microcomputer 502.

When the switch 702 of the electric tool 700 is turned on, the circuit power voltage such as 5 V is supplied through the power supply circuit 20, the battery voltage detecting circuit 540, and the constant-voltage circuit 10 and thus the microcomputer 602 is operable. Accordingly, the GND level signal is inputted to the gate terminal of the FET 21 of the power supply circuit 20 and the FET 21 is kept turned on. The microcomputer 602 controls the switching frequency and the switching duty of the FET 31 of the switching circuit 30 on the basis of the state of the switch 505 and monitors the temperature of the FET 31 to control the switching duty on the basis of the detected temperature. That is, when the switch 505 is connected to the terminal 505A, the voltage conversion is not performed to keep the FET 31 turned off. When the switch 505 is connected to the terminal 505B, the pulse signal is outputted to the gate terminal of the FET 31 of the switching circuit 30 to be converted into a predetermined voltage that can drive the electric tool 200.

The microcomputer 602 counts the time when the electric power is supplied from the power supply circuit 20, and then the signal for turning off the FET 21 is outputted after a predetermined time. When the power supply circuit 20 is turned off, the electric power supplied to the microcomputer 602 is cut off.

As described above, the switching circuit 30 is connected between the inductor 608 and the minus terminal. When the signal based on the switching frequency and the switching duty of the microcomputer 602 is inputted to the gate terminal of the FET 31 of the switching circuit 30, the switching circuit 30 is turned on or off.

While the FET 31 is turned on, the inductor 608 accumulates energy on the current path formed between the plus terminal and the minus terminal of the battery pack 100. While the FET 31 is turned off, the inductor 608 outputs the energy through the diode 604.

While the FET 31 is turned on, the diode 604 prevents the capacitor 609 from being discharged. While the FET 31 is turned off, the diode 604 becomes the current path from the inductor 608 to the electric tool 700 and the capacitor 609.

While the FET 31 is turned on, the capacitor 609 supplies the accumulated energy to the electric tool 700. While the FET 31 is turned off, the capacitor is charged by the energy accumulated in the inductor 608 in addition to the power voltage of the battery pack 100.

That is, the inductor 608 accumulates the energy by turning on the FET 31, and the voltage (raised voltage) in which the charge voltage of the capacitor 609 is added to the energy of the inductor 608 by turning off the FET 31 can be supplied to the electric tool 700.

Hereinafter, the operation of the battery pack 100, the adaptor 600, and the electric tool 700 configured above will be described. When the switch 702 of the electric tool 700 is turned on, the voltage is applied to the drain terminal of the FET 651 of the stopping signal detecting circuit 650. Since the voltage is applied to the gate terminal of the FET 22 of the power supply circuit 20, the FET 22 is turned on and thus the FET 21 is also turned on. Accordingly, the battery voltage is supplied to the constant-voltage circuit 10. When the power voltage is supplied to the constant-voltage circuit 10, the constant-voltage circuit 10 converts the power voltage into the circuit power voltage such as 5 V and supplies the converted voltage to the microcomputer 602. When the power voltage is supplied to the microcomputer 602, the microcomputer 602 outputs the gate signal (on-signal) to the FET 651; the FET 651 is turned on; and the closed circuit of the battery pack 100 and the electric tool 700 are formed. The microcomputer 602 inputs the GND (L) level signal to the gate terminal of the FET 21 of the power supply circuit 20 to keep the FET 21 turned on.

When the circuit power voltage such as 5 V is inputted, the microcomputer 602 judges whether the voltage switching switch 505 is turned on (terminal 505B: ground level) or not. When the voltage switching switch 505 is turned on, the microcomputer 602 outputs the pulse signal at a predetermined frequency at a duty corresponding to a ratio to raise the voltage, so that the output voltage of the battery pack 100 is raised and converted into the driving voltage of the electric tool 700 in the present embodiment, thereby switching the FET 31. When the voltage switching switch 505 is turned off (terminal 505A), the microcomputer 502 judges that the voltage conversion is not performed to keep the FET 13 turned off.

At this time, the temperature of the FET 31 is detected by the thermistor 506. The output (5 V) of the constant-voltage circuit 10 is divided by the resistor 7 and the thermistor 506 and then the temperature is detected on the basis of the divided value. When the temperature of the FET 31 detected by the thermistor 506 is higher than 120° C., the switching duty is reduced to suppress the temperature rising of the FET 31 until the temperature is lower than, for example, 100° C.

In the present embodiment, when the FET 31 is turned on, the current path with the inductor 608 and the FET 31 interposed between the plus terminal and the minus terminal of the battery pack 100 is formed and thus the energy is accumulated in the inductor 608. When the FET 31 is turned off, the energy accumulated in the inductor 608 is added to the output voltage of the battery pack 100 and then the added voltage is supplied to the electric tool 700 and the capacitor 609. At this time, the capacitor 609 is charged. While the FET 31 is turned on, the energy charged in the capacitor 609 is supplied to the electric tool 700. The voltage supplied to the electric tool 700 is obtained by raising the output voltage of the battery pack 100 in proportion to a ratio of a total time of the on-time and the off-time to the off-time of the FET 31.

In the present embodiment, there are provided the overcurrent preventing function, the overdischarge preventing function, and the power saving function as well as the battery pack 100 and the adaptor 500 the second modified example of the first embodiment. As described above, when the overcurrent or the overdischarge is detected by the battery voltage detecting circuit 540, the microcomputer 602 outputs the discharge stopping signal to the FET 651 of the stopping signal detecting circuit 650. Accordingly, the supply of the electric power is stopped. Further, since the overcurrent and the overdischarge are detected by the protective IC 120, the FET 651 is cut off by the detected signal (discharge stopping signal). The stopping signal detecting circuit 650 may be connected between the plus terminal of the battery pack 100 and the plus terminal of the electric tool 700.

The voltage raised by the adaptor 600 is supplied to the electric tool 700 through the plus and minus terminals of the adaptor 600 to rotate the motor 701, thereby driving the electric tool 700.

When the switch 702 of the electric tool 700 is turned off, the voltage is not supplied to the motor 701, thereby stopping the motor 701. In the adaptor 600, since the circuit power voltage such as 5 V is continuously supplied from the battery pack 100 to the power supply maintaining circuit 40 through the power supply circuit 20 and the constant-voltage circuit 10. Since the microcomputer 602 counts the time after the circuit power voltage is supplied from the power supply circuit 20, the transistor 42 is kept turned on until a predetermined time elapses. Accordingly, the power supply circuit 20 and the constant-voltage circuit 10 are driven. When the predetermined time elapses, the microcomputer 602 outputs the signal for turning off the FET 21; the power supply circuit 20 is turned off; and thus the electric power supplied from the battery pack 100 to the adaptor 700 is cut off.

As specifically described above, according to the battery pack 100, the adaptor 600, and the electric tool 700 of the second embodiment, the electric tool 700 can be driven in an efficient manner due to the raising of the output voltage of the battery pack 100 by interposing the adaptor 600 therebetween, even when the insertion type of the electric tool 700 is different from that of the battery pack 100 or the driving voltage of the electric tool 700 is different from the output voltage of the battery pack 100. Since the microcomputer 602 of the adaptor 700 also has the power saving function; the overdischarge preventing function; and the overcurrent preventing function, the electric tool 700 can be used in a more safer and efficient manner.

Third Embodiment

Figure 15:
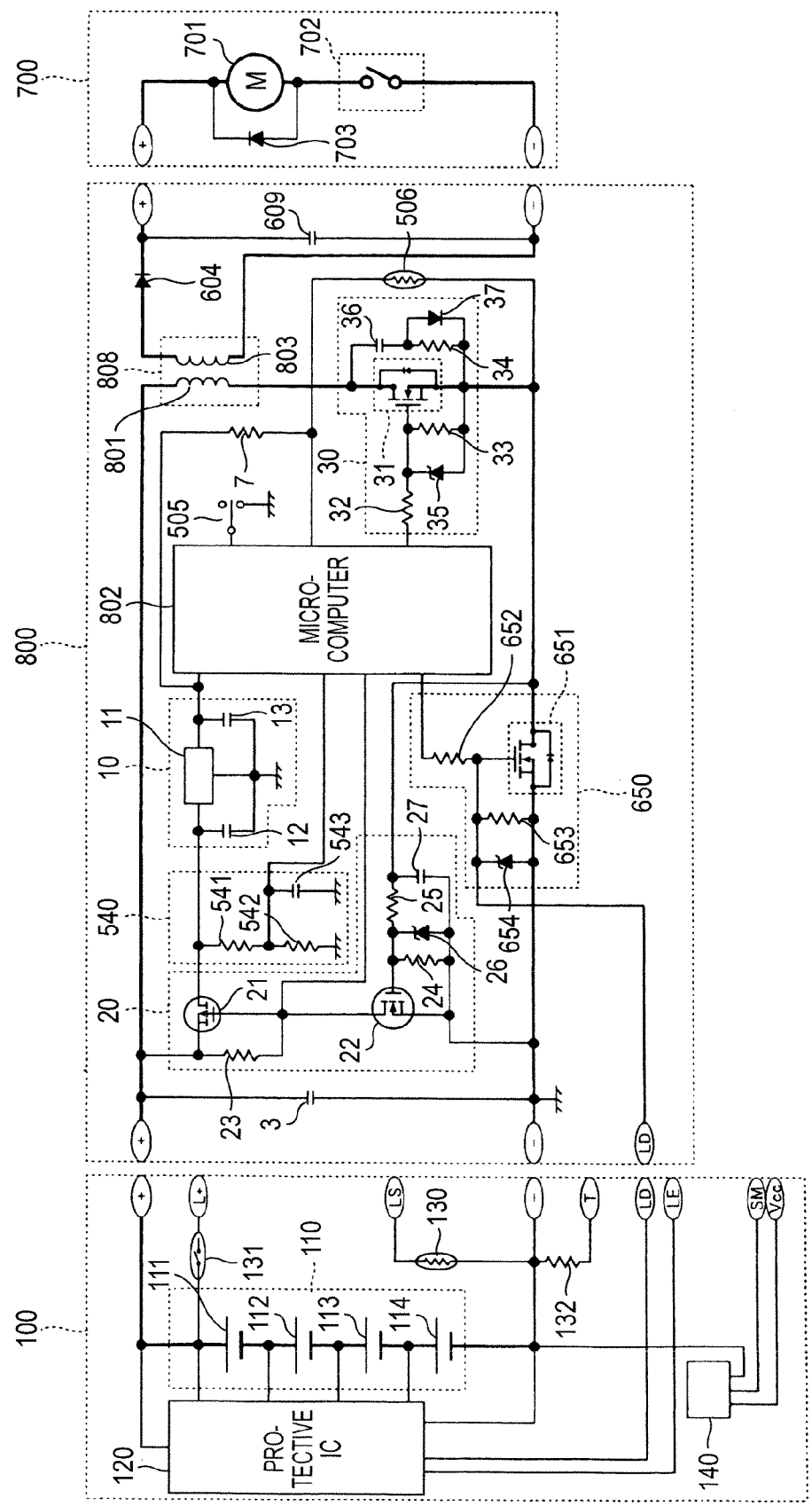
FIG. 15 is a circuit diagram illustrating a use state of an adaptor according to a third embodiment of the invention.

Hereinafter, a third embodiment of the invention will be described in detail with reference to FIG. 15. FIG. 15 is a circuit diagram illustrating a connection state of an adaptor 800 according to the third embodiment, the battery pack 100 and the electric tool 700 that are connected to the adaptor 800. The same reference numeral is given to the component having the same configuration and operation as the first embodiment, the modified examples thereof, or the second embodiment, and the description thereof is omitted.

The appearance in a use state of the adaptor 800 according to the third embodiment is substantially the same as that of the modified example of the second embodiment. The adaptor 800 is a device that mechanically and electrically connects the electric tool 700 to the battery pack 100 outputting a lower voltage than a rated voltage of the electric tool 700 to use the electric tool 700. For example, the adaptor 800 is connectable to the battery pack 100 in the sliding manner and is connectable to the electric tool 700 in the insertion manner.

First, the inner configuration when the battery pack 100 is used as the power supply of the electric tool 700 with the adaptor 800 interposed therebetween will be described. The battery pack 100 and the electric tool 700 are the same as those of the second embodiment, and thus the description thereof is omitted.

The adaptor 800 raises the input voltage such as the battery voltage of 14.4 V of the battery pack 100 and converts the raised voltage into the voltage corresponding to the rated voltage of the electric tool 700. The adaptor 800 includes the plus terminal that is electrically connected to the plus terminal of the battery pack 100, the minus terminal that is electrically connected to the minus terminal of the battery pack 100, the LD terminal that is electrically connected to the LD terminal outputting the battery state signal of the battery pack 100, the plus and minus terminals that are electrically connected to the plus and minus terminals of the electric tool 700, respectively. Further, the adaptor 800 mainly includes the constant-voltage circuit 10, the power supply circuit 20, the switching circuit 30, the battery voltage detecting circuit 540, the microcomputer 802, the switch 505, the thermistor 506, a transformer 808, the diode 604, the capacitor 609, and the stopping signal detecting circuit 650.

Although both of the adaptor 600 and the adaptor 800 have the voltage raising function, differences between the adaptor 600 and the adaptor 800 are that the micro computer 802 is provided instead of the micro computer 602; the transformer 808 is provided instead of the voltage raising inductor 608; and the diode 604 and the capacitor 609 are provided in a secondary side of the transformer.

The transformer 808 is provided with an inductor 801 in a primary side and with an inductor 803 in the secondary side. The inductor 801 is connected between the plus terminal on the battery pack 100 side and the switching circuit 30. The inductor 803 is connected between the plus terminal and the minus terminal on the electric tool 700 side through the diode 604. The capacitor 609 is connected between the plus terminal and the minus terminal on the electric tool 700 side. When the pulse signal at a predetermined duty and a predetermined frequency is inputted to the FET 31 of the switching circuit 30, the voltage to be supplied to the electric tool 700 can be changed by the transformer 808 on the basis of the duty of the pulse signal and a rate of the number of windings of the inductor. Accordingly, the transformer 808 can drop the battery voltage as well as raise the battery voltage.

The diode 604 rectifies the alternating voltage of the inductor 803 generated by turning on and off the FET 31 and constitutes a rectification smoothing circuit together with the capacitor 609.

The diode 604 provided to prevent the capacitor 609 from being discharged, and the capacitor 609 smoothes the output voltage while charged and discharged by turning on and off the FET 31.

A difference between the microcomputer 802 and the microcomputer 602 is the signal outputted to the FET 31 by turning on and off the switch 505. In the present embodiment, when the switch 505 is turned on, the duty of the pulse signal at a predetermined frequency is adjusted on the basis of a ratio of the number of windings of the inductor 801 and the inductor 803 and thus the output voltage of the desired voltage value is outputted. Further, when the switch 505 is turned off, the duty of the pulse signal at a predetermined frequency is adjusted on the basis of a ratio of the number of windings of the inductor 801 and the inductor 803 and thus the same output voltage as the voltage of the battery pack 100 is outputted.

The operation of the battery pack 100, the adaptor 800, and the electric tool 700 configured above will be described. When the switch 702 of the electric tool 700 is turned on, the voltage is applied to the drain terminal of the FET 651 of the stopping signal detecting circuit 650; the voltage is applied to the gate terminal of the FET 22 of the power supply circuit 20; the FET 22 is turned on; and thus the FET 21 is turned on. Accordingly, the battery voltage is supplied to the constant-voltage circuit 10. When the power voltage is supplied to the constant-voltage circuit 10, the constant-voltage circuit 10 converts the power voltage into the circuit power voltage such as 5 V to supply the converted voltage to the microcomputer 802. The microcomputer 802 inputs the GND (L) level signal to the gate terminal of the FET 21 of the power supply circuit 20 to keep the FET 21 turned on.

When the circuit power voltage such as 5 V is inputted, the microcomputer 802 judges whether the voltage switching switch 505 is turned on or not. When the voltage switching switch 505 is turned (voltage conversion is performed), the microcomputer 802 outputs the pulse signal at a predetermined duty at a predetermined frequency to the FET 31 to switch the FET 31, so that the output voltage of the battery pack 100 converts the desired voltage for driving the electric tool 700. An electromotive is generated due to electromagnetic induction caused by switching the FET 31, and thus the desired voltage is outputted between the plus terminal and the minus terminal of the electric 700. When the switching switch 505 is turned off, the microcomputer 802 judges that the voltage conversion is not performed and outputs the pulse signal at a predetermined duty that is different from that of the case where the voltage conversion is performed at a predetermined frequency, thereby switching the FET 31. An electromotive is generated due to electromagnetic induction caused by switching the FET 31, and thus the same voltage as the output voltage of the battery pack 100 is outputted between the plus terminal and the minus terminal of the electric 700.

At this time, the temperature of the FET 31 is detected by the thermistor 506. The output voltage (5 V) of the constant-voltage circuit 10 is divided by the resistor 7 and the thermistor 506 and the temperature is detected by the divided voltage value. When the temperature of the FET 31 detected by the thermistor 506 is higher than 120° C., the humidity of the FET 31 is prevented from rising by reducing the switching duty until the temperature is lower than, for example, 100° C.

In the present embodiment, the pulse signal is outputted to the FET 31 in both cases of the voltage conversion and no voltage conversion. The voltage to be supplied to the electric tool 700 is raised on the basis of the ratio of windings of the inductor 801 and the inductor 803 and the duty of the pulse signal. In addition, the voltage may be dropped.

In addition, the present embodiment is provided with the overcurrent preventing function, the overdischarge preventing function, and the power saving function, as well as the battery pack and the adaptor in the first to third embodiments. As described above, when the overcurrent or the overdischarge is detected by the battery voltage detecting circuit 540, the microcomputer 802 outputs the discharge stopping signal to the FET 651 of the stopping signal detecting circuit 650, thereby stopping the supplying of the electric power. Also when the overcurrent or the overdischarge is detected by the protective IC 120 of the battery pack 100, the discharge stopping signal is outputted through the LD terminal to turn off the FET 651. The stopping signal detecting circuit 650 may be connected between the plus terminal of the battery pack 100 and the plus terminal of the electric tool 700.

The voltage raised (dropped) by the adaptor 800 as described above is supplied to the electric tool 700 through the plus terminal and the minus terminal of the adaptor 800 to rotate the motor 701, thereby driving the electric tool 700.

When the switch 702 of the electric tool 700 is turned off, the voltage is not supplied to the motor 701, thereby stopping the motor 701. In the adaptor 800, the circuit power voltage such as 5 V is continuously supplied from the battery pack 100 to the microcomputer 802 through the power supply circuit 20 and the constant-voltage circuit 10. Since the microcomputer 802 counts the time after the circuit power voltage is supplied from the power supply circuit 20, the FET 21 is kept turned on until a predetermined time elapses. Accordingly, the power supply circuit 20 and the constant-voltage circuit 10 are driven. When the predetermined time elapses, the microcomputer 802 outputs the signal for turning off the FET 21; the power supply circuit 20 is turned off by turning off the FET 21; and thus the electric power supplied from the battery pack 100 to the adaptor 800 is cut off.

As specifically described above, according to the battery pack 100, the adaptor 800, and the electric tool 700 of the third embodiment, the electric tool 700 can be driven in an efficient manner due to the raising of the output voltage of the battery pack 100 by interposing the adaptor 800 therebetween, even when the insertion type of the electric tool 700 is different from that of the battery pack 100 or the driving voltage of the electric tool 700 is different from the output voltage of the battery pack 100. Since the microcomputer 802 of the adaptor 700 also has the power saving function; the overdischarge preventing function; and the overcurrent preventing function, the electric tool 700 can be used in a more safer and efficient manner.

Fourth Embodiment

Next, a case where the battery pack 100 is used as the driving source for the electric tool 300 without the adaptor interposed therebetween will be described. As described above, FIG. 5 is a diagram illustrating a use state of the slide-type battery pack 100 and the electric tool 300 that is regularly connectable thereto. As shown in FIG. 5, in the battery pack 100 according to the present embodiment, the electric power can be supplied to the electric tool 300 in a state where the battery pack 100 is directly connected to the electric tool 300 that is regularly connectable to the slide-type battery pack 100.

Figure 16:
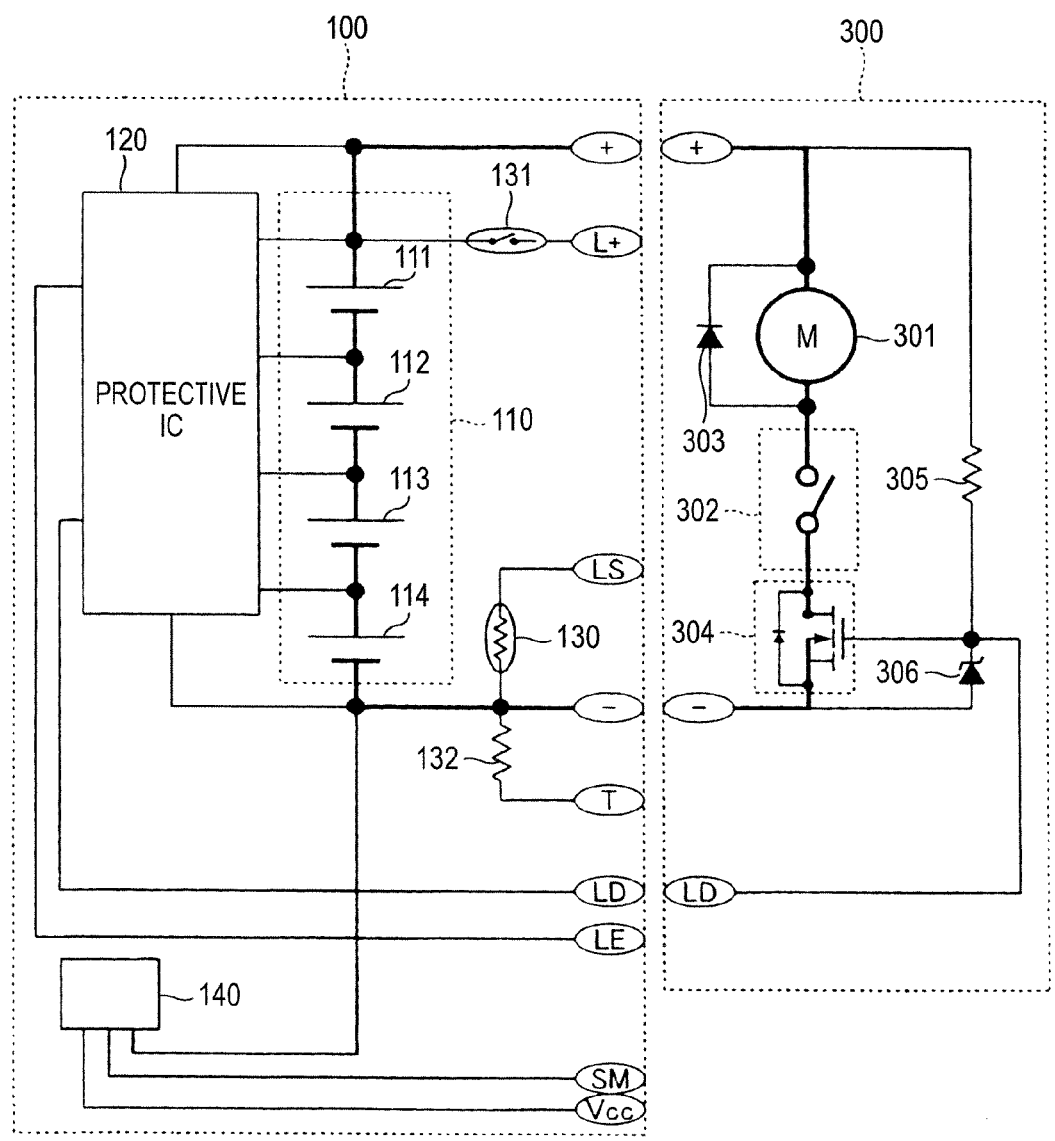
FIG. 16 is a circuit diagram illustrating a state where a battery pack is directly connected to an electric tool according to a fourth embodiment of the invention.

FIG. 16 is a circuit diagram illustrating the connection state of the battery pack according to the fourth embodiment of the invention and the electric tool 300 that is regularly connectable to the battery pack 100.

As shown in FIG. 16, the battery pack 100 is formed of lithium cells 111 to 114, and a nominal voltage thereof is 14.4 V obtained by connecting four 3.6-volt element cells in series. The electric motor 300 includes a motor 301, switch 302, and an FET 304 that stops the operation of the electric tool 300 (cutting off the closed circuit between the motor 301 and the battery pack 300) when the battery pack 100 becomes in the abnormal state such as the overdischarge and the overcurrent. In the present embodiment, the electric tool 300 is an electric device for 14.4 V, and the electric tool 300 is normally operable when the 14.4-volt battery pack 100 of is connected to the electric tool 300 for 14.4 V.

In FIG. 16, the configuration and operation of the electric 100 are the same as the battery pack 100 of the first embodiment according to the third embodiments. The electric tool 300 is provided with the motor 301, the switch 302, a flywheel diode 303, the FET 304, a pull-up resistor 305, and a zener diode 306. The motor 301 and the switch 302 are connected to each other in series. A drain terminal of the FET 304 and a source terminal are connected between the switch 302 and the minus terminal. A gate terminal of the FET 305 is connected to the LD terminal. The gate terminal connected to the plus terminal through the pull-up resistor 305 and is connected to the minus terminal through the zener diode 306. The FET 304 is turned on by the battery voltage of the battery pack 100. That is, when the battery pack 100 is normally connected to the electric tool 300, the FET 304 is turned on.

When a predetermined voltage is supplied from the battery pack 100 to gate terminal of the FET 304 through the pull-up resistor 305, the FET 304 is also turned on. Thus, when the switch 302 is turned on, a predetermined voltage is supplied from the battery pack 100 to the motor 301, thereby driving the electric tool 300. When the switch 302 is turned off, the closed circuit between the plus terminal and the minus terminal is cut off, thereby stopping driving the electric tool 300.

The protective IC 120 of the battery pack 100 has the overdischarge detecting function and the overcurrent detecting function for each lithium cells 111 to 114. When the overdischarge or overcurrent state is detected, the discharge stopping signal is outputted through the LD terminals of the battery pack 100 and the electric tool 300; the FET 304 is turned off; and thus the electric power supplied to the electric tool 300 is cut off.

As described above, the battery pack 100 is directly connected to the electric tool 300 to supply the electric power to the electric tool 300, and thus the electric tool 300 can be driven. In addition, since there are provided the overdischarge preventing function and the overcurrent preventing function, the electric tool 300 can be used in a safe and efficient manner.

Fifth Embodiment

Figure 17:
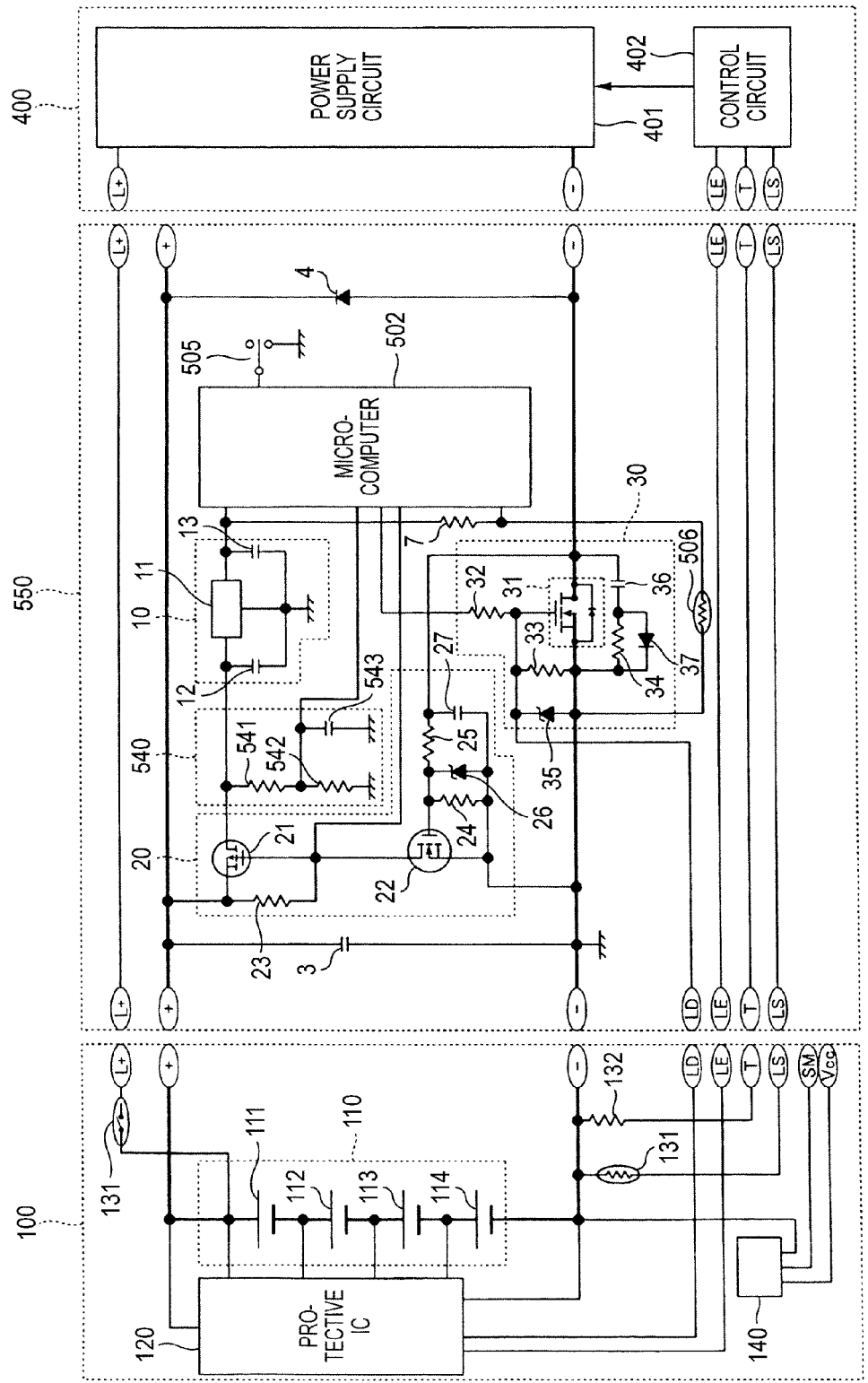
FIG. 17 is a circuit diagram illustrating a charge state of an adaptor-attached battery pack according to a fifth embodiment of the invention.

Next, a case where the battery pack 100 connected to the adaptor 550 is charged will be described with reference to FIG. 17. As shown in FIG. 17, an adaptor 550 has a charge terminal L+ that is electrically connectable to a charger 400. In the present embodiment, the charge plus terminal (L+) is provided separately from the plus terminal that is electrically connectable to the electric tool 200, and the minus terminal used in common with the minus terminal for the electric tool 200 is electrically connectable to the charger 400. The charge plus terminal and the discharge plus terminal may used in common with each other. In this case, the number of terminals can be reduced.

The protective IC 120 of the battery pack 100 monitors each voltage of the element cells 111 to 114 of the battery group 110 as described above. For example, when the overcharge occurs such as continuous charging in spite of the element cells 111 to 114 charged to a predetermined voltage, the protective IC 120 outputs the overcharge signal to the charger 400 through the LE terminal and the inner signal line of the adaptor 500. As described above, the protective IC 120 monitors the current of the battery group 110. When the current is lower than a predetermined value, the protective IC judges that the battery group 110 is full charged and outputs the full-charge signal to the charger 400 through the LE terminal and the inner signal line of the adaptor 500, thereby stopping the charging. A battery-type signal based on the battery type obtained from the identification resistor 132 or the number of the element cells is outputted to the charger 400 through the T terminal and the inner signal line of the adaptor 500. A temperature signal based on the battery temperature detected by the thermistor 130 is outputted to the charger 400 through the LS terminal and the inner signal line of the adaptor 500. The charger 400 controls the charge current and the charge voltage on the basis of the battery-type signal from the T terminal and the temperature signal from the LS terminal to charge the battery pack 100. In addition, the battery voltage of the battery pack 100 is also detected.

The adaptor 550 is substantially the same as the adaptor 500 described in the second modified example of the first embodiment. However, as the terminals 9 of the insertion portion 1B described with reference to FIGS. 1 to 3, the adaptor 550 of the present embodiment are provided seven terminals that are a charge terminal L+, a plus terminal, a minus terminal, an LD terminal, an LE terminal, a T terminal, and an LS terminal. Five terminals that are a charge terminal L+, a minus terminal, an LE terminal, a T terminal, and an LS terminal are provided on the charger 400 side.

The charger 400 includes a charge terminal, an L+ terminal, a minus terminal, an LE terminal, a T terminal, an LS terminal, a power supply circuit 401 that supplied electric power to the battery pack 100, and a control circuit 402 that controls an operation of the power supply circuit 401. The power supply circuit 401 is connected to the charge terminal L+ and the minus terminal, and supplied electric power to the battery pack 100 through the adaptor 550. The control circuit 402 is connected to the LE terminal, the T terminal, and the LS terminal that are connected to the battery pack 100 through the adaptor 550. The control circuit 402 outputs control signals to the power supply circuit 401 on the basis of signals inputted from the LE terminal, the T terminal, and the LS terminal.

As described above, when the battery pack 100 is charged by the charger through the adaptor 550, the adaptor 550 is connected to the charger 400 in a state where the battery pack 100 is connected to the adaptor 550. The control circuit 402 of the charger 400 identifies the number of element cells (battery types) on the basis of the battery-type signal inputted from the T terminal through the adaptor 550, determines a charge voltage and a charge current on the basis thereof, and then outputs a predetermined output to the power supply circuit 401. The power supply circuit 401 supplies electric power from the charge terminal L+ and the minus terminal to the battery pack 100 through the adaptor 550. In this case, since the charge current flows through the diode 37 that serves as an evasion unit of the FET 31 regardless of the operation of the microcomputer 502, that is, regardless of turning on the FET 31. Accordingly, the charging is operable. That is, the charging is operable without driving the adaptor 550. The diode 37 is connected to the FET 31 in parallel. A cathode of the diode 37 is connected to a minus terminal side of on the battery pack side and an anode is connected to a minus terminal side of the battery pack 100.

In the battery pack 100, each battery voltage is monitored by the protective IC 120. When the overcharge detecting signal is inputted from the LE terminal through the adaptor 550 or the temperature abnormality detecting signal is inputted from the LS terminal through the adaptor 550, the control circuit 402 outputs the output stopping signal to the power supply circuit 401, thereby stopping the supply of the electric power.

The full-charge detection of the battery pack 100 is performed by a charge current detecting unit, a battery voltage detecting unit, a battery temperature detecting unit (all not shown), or the like of the charger 400. For example, in a case where the battery pack 100 is formed of lithium cells, it is determined that the battery pack 100 is full charged at the time when the charge current detected by the charge current detecting unit is equal to or less than the full-charged current value, thereby stopping the charging. In a case where the battery pack 100 is formed of NiCad cells or Nickel hydrogen cells, it is determined that the battery pack 100 is full charged in the known −ΔV method for determining the full charge at the time when the battery voltage detected by the battery voltage detecting unit is dropped from the peak value to a predetermined value. Further, it is possible to determine the full charge by detecting the battery temperature inputted from the LS terminal by the temperature detecting unit.

As described above, the battery pack 100 can be charged by the charger 400 in the state where the battery pack 100 is connected to the adaptor 550. When the slide-type battery pack 100 is charged by the insertion-type charger as described above, the terminals of the adaptor 550 are electrically connected to the charge terminals of the charger 400 in the state where the adaptor 550 is electrically connected to the battery pack 100, thereby charging the battery pack 100. In this case, a protective unit for preventing overcharge may be provided in the adaptor 550 as well as the overdischarge preventing function and the overcurrent preventing function are provided.

As specifically described above, since there is provided the effective voltage converting unit for converting the battery voltage of the battery pack into a predetermined voltage necessary for the electric tool, it is possible by the only use of a lithium cell assembly to selectively output a predetermined voltage which is difficult to obtain from a conventional assembly. Since the electric power is supplied to the constant-voltage unit on the basis of the switching operation of the electric tool, the power consumption of the battery pack can be reduced. Since there is provided the protective unit for cutting off the current supply path on the basis of the battery state signal of the overdischarge or the overcurrent from the battery pack, the breakdown or the decrease in life of the battery pack can be prevented.

Figure 18:
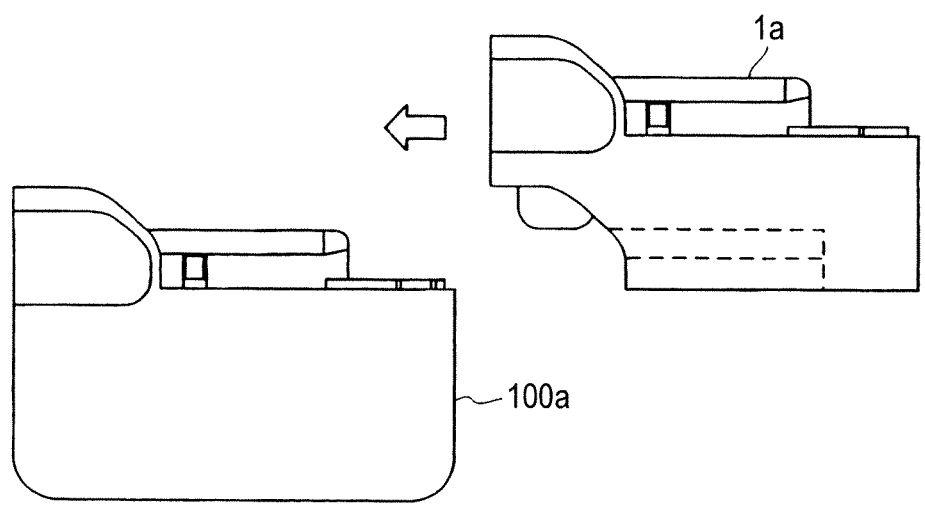
FIG. 18 is a side view of a slide-type battery pack and a slide-type adaptor.
Figure 19:
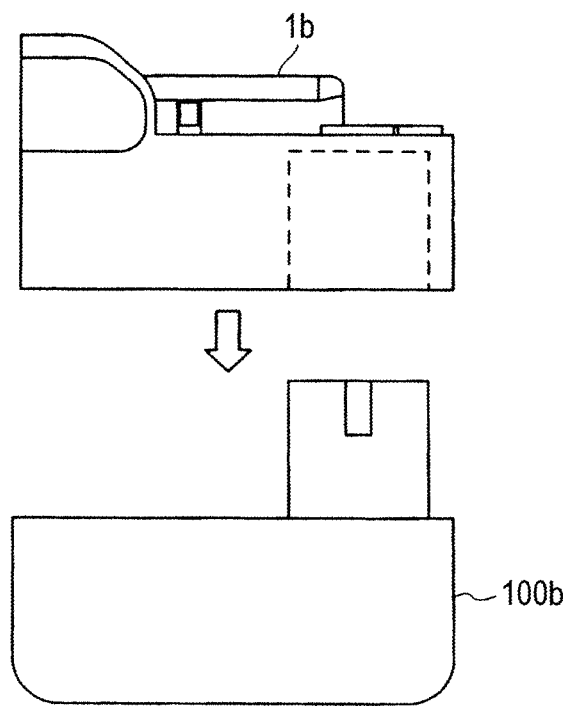
FIG. 19 is a side view of an insertion-type battery pack and a slide-type adaptor.
Figure 20:
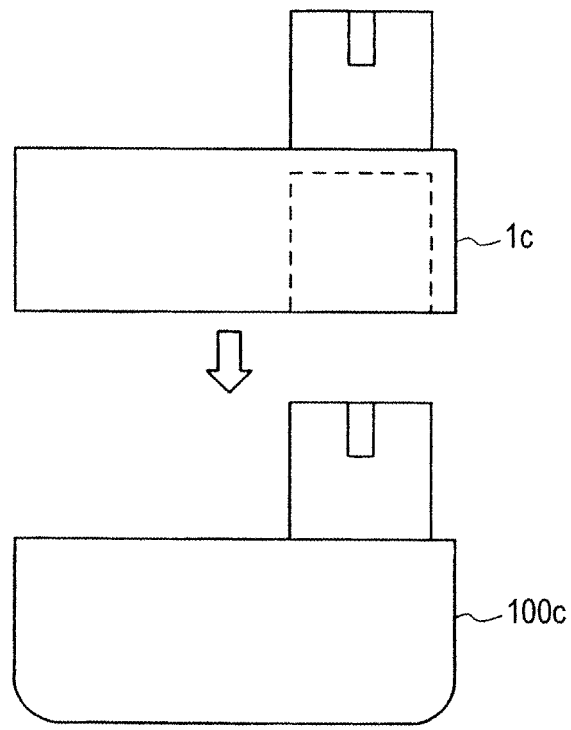
FIG. 20 is a side view of an insertion-type battery pack and an insertion-type adaptor.

The adaptor, the assembly of the battery pack and the adaptor, and the electric tool including the same according to the invention is not limited to the above-described embodiments, and may be variously modified and improved within the scope described in Claims. For example, as shown in FIG. 18, a slide-type adaptor 1*a* may be attached to a slide-type battery pack 100*a*. As shown in FIG. 19, a slide-type adaptor 1*b* may be attached to an insertion-type battery pack 100*b*. As shown in FIG. 20, an insertion-type adaptor 1*c* may be attached to an insertion-type battery pack 100*c*. The slide-type battery pack 100*a* shown in FIG. 18 is the same as the electric pack 100 shown in FIGS. 1, 3, or the like. The adaptor 1*a* is attached to the electric tool having a slide-type attachment portion. The insertion-type battery pack 100*b* shown in FIG. 19 has an insertion portion having substantially the same shape as the oval-cylindrical insertion portion 1B of the adaptor 1 shown in FIG. 1. Originally, the insertion-type battery pack 100*b* is intended to be used in a manner that the insertion portion thereof is inserted into the hollow portion formed in the handle portion 200B of the electric tool 200. However, FIG. 19 shows an example in which the battery pack 100*b* is used in a manner that the battery pack 100*b* having such a shape is inserted into a space (a part indicated by a doted line) formed in the slide-type adaptor 1*b* and the adaptor 1*b* is attached to the electric tool having the slide-type attachment portion. The insertion-type battery pack 100*b* shown in FIG. 20 is the same as the battery pack shown in FIG. 19. The insertion-type adaptor 1*c* shown in FIG. 20 is basically the same as the adaptor 1 shown in FIG. 1, 3, or the like. However, the adaptor 1*c* is different from the adaptor shown in FIG. 1, 3, or the like in that a space (a part indicated by a doted line) for receiving the insertion portion of the battery pack 100*b* is formed. The adaptor 1*c* attached to the battery pack 100*b* is used in a manner that the adaptor 1*c* is inserted into an electric tool having a battery pack insertion portion formed therein.

In the present embodiment, the battery voltage of the battery pack is described as 14.4 V, the rated voltage of the electric tool 200 is described as 12 V, and the voltage conversion from 14.4 V to 12 V is selected by the switch 5, but the voltage conversion may be automatically selected. In this case, when the output voltage of the adaptor is set higher than the rated voltage of the electric tool, a connection preventing unit that is interlinked with the voltage switching unit may be provided so as to prevent the adaptor from being connected to the electric tool. The battery voltage may be converted into 9.6 V, 7.2 V, 18 V, or 24 V by changing the switching duty. The battery pack may be integrated with the adaptor (the battery pack has the adaptor function therein), and thus the voltage may be converted by the battery pack.

What is claimed is:

1. A power unit for an electric tool, the power unit comprising:
    a battery pack;
    an adaptor that connects the electric tool and the battery pack, the adaptor including a setting unit configured to set an output voltage to be applied to the electric tool; and
    a preventing unit configured to mechanically prevent the adaptor from being connected to the electric tool when the output voltage of the adaptor is set larger than a rated voltage of the electric tool,
    wherein the adaptor is configured to be connected to the electric tool after the output voltage is set by the setting unit;
    wherein the adaptor includes a voltage converting unit configured to convert the voltage of the battery pack into a predetermined voltage,
    wherein the voltage converting unit includes a switching unit that is connected between the battery pack and the electric tool and a control unit configured to control the switching unit, and
    wherein the control unit controls the switching unit on the basis of the setting by the setting unit.

2. The power unit according to claim 1,
    wherein the setting unit includes a switch unit whose position is changed according to the rated voltage, and
    wherein the preventing unit includes the switch unit.

3. The power unit according to claim 2,
wherein the battery pack includes a monitoring unit configured to monitor a state of the battery pack, and
wherein the switching unit is turned off in response to a signal from the monitoring unit.

4. The power unit according to claim 3,
wherein the signal form the monitoring unit is an abnormal signal.

* * * * *